(12) United States Patent
Yoon et al.

(10) Patent No.: US 12,046,802 B2
(45) Date of Patent: Jul. 23, 2024

(54) ELECTRONIC DEVICE INCLUDING ANTENNA DEVICE

(71) Applicant: Samsung Electronics Co., Ltd., Suwon-si (KR)

(72) Inventors: Shinho Yoon, Suwon-si (KR); Dongjun Oh, Suwon-si (KR); Jonghyuck Lee, Suwon-si (KR); Soonho Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/305,764

(22) Filed: Apr. 24, 2023

(65) Prior Publication Data

US 2023/0261365 A1    Aug. 17, 2023

Related U.S. Application Data

(63) Continuation of application No. 17/957,631, filed on Sep. 30, 2022, now Pat. No. 11,637,363, which is a
(Continued)

(30) Foreign Application Priority Data

Feb. 19, 2019    (KR) ........................ 10-2019-0019551
Jul. 1, 2019     (KR) ........................ 10-2019-0078718

(51) Int. Cl.
*H04B 1/38*     (2015.01)
*G06F 1/16*     (2006.01)
(Continued)

(52) U.S. Cl.
CPC ............ *H01Q 1/243* (2013.01); *G06F 1/1681* (2013.01); *H01Q 1/42* (2013.01); *H01Q 1/48* (2013.01); *H01Q 13/16* (2013.01); *H04M 1/0216* (2013.01)

(58) Field of Classification Search
CPC ............. H04M 1/0216; H04M 1/0214; H04M 1/0225; H01Q 1/243; H01Q 1/42; H01Q 1/48; H01Q 13/16; G06F 1/1681
See application file for complete search history.

(56) References Cited

U.S. PATENT DOCUMENTS 8,725,213 B2     5/2014   Nakamura
10,652,374 B2 *  5/2020   Song ...................... B22D 17/00
(Continued)

FOREIGN PATENT DOCUMENTS

CN      104638344 A     5/2015
CN      104993855 A    10/2015
(Continued)

OTHER PUBLICATIONS

Korean Office Action dated May 14, 2020, issued in Korean Application No. 10-2019-0078718.
(Continued)

*Primary Examiner* — Tuan Pham
(74) *Attorney, Agent, or Firm* — Jefferson IP Law, LLP

(57) ABSTRACT

An electronic device is provided. The electronic device includes a first housing structure including a first side surface member, a second housing structure including a second side surface member, a hinge structure configured to rotatably connect the first housing structure and the second housing structure and configured to provide a folding axis on which the first housing structure and the second housing structure rotate, and at least one printed circuit board, wherein the first side surface member or the second side surface member includes a first side surface portion a second side surface portion, a third side surface portion, a fourth side surface portion, a fifth side surface portion, a first slit a second slit a third slit, and a fourth slit, and a fifth slit, and wherein at least part of at least one of the second side surface portion, the third side surface portion, and the fourth side
(Continued)

surface portion is formed of a radiation conductor and is electrically connected to the at least one printed circuit board.

17 Claims, 23 Drawing Sheets

Related U.S. Application Data continuation of application No. 17/459,165, filed on Aug. 27, 2021, now Pat. No. 11,462,818, which is a continuation of application No. 16/794,859, filed on Feb. 19, 2020, now Pat. No. 11,139,554.

(51) Int. Cl.
  *H01Q 1/24* (2006.01)
  *H01Q 1/42* (2006.01)
  *H01Q 1/48* (2006.01)
  *H01Q 13/16* (2006.01)
  *H04M 1/02* (2006.01)

(56) References Cited

U.S. PATENT DOCUMENTS

| | | |
|---|---|---|
| 2007/0037619 A1 | 2/2007 | Matsunaga et al. |
| 2010/0222111 A1 | 9/2010 | Suetake |
| 2011/0128192 A1 | 6/2011 | Lee et al. |
| 2012/0264489 A1* | 10/2012 | Choi .................. H04M 1/0247 455/566 |
| 2014/0240178 A1 | 8/2014 | Chun et al. |
| 2015/0003551 A1 | 1/2015 | Kim |
| 2015/0357703 A1 | 12/2015 | Nickel et al. |
| 2016/0064820 A1 | 3/2016 | Kim et al. |
| 2017/0110786 A1 | 4/2017 | Liu |
| 2017/0142241 A1 | 5/2017 | Kim et al. |
| 2017/0214123 A1 | 7/2017 | Park et al. |
| 2017/0346164 A1 | 11/2017 | Kim et al. |
| 2018/0048359 A1 | 2/2018 | Kim et al. |
| 2018/0219274 A1 | 8/2018 | Wang et al. |
| 2018/0366812 A1 | 12/2018 | Kim et al. |
| 2019/0140342 A1 | 5/2019 | Lim et al. |
| 2020/0333855 A1* | 10/2020 | Kim .................... G06F 1/1681 |

FOREIGN PATENT DOCUMENTS

| | | |
|---|---|---|
| CN | 105789827 A | 7/2016 |
| EP | 3 439 103 A1 | 2/2019 |
| JP | 2002-190752 A | 7/2002 |
| JP | 2006-340180 A | 12/2006 |
| KR | 10-2015-0001072 A | 1/2015 |
| KR | 10-2015-0112629 A | 10/2015 |
| KR | 10-2016-0027700 A | 3/2016 |
| KR | 10-2017-0056246 A | 5/2017 |
| KR | 10-2017-0120985 A | 11/2017 |
| KR | 10-2017-0133952 A1 | 12/2017 |
| KR | 10-2018-0137993 A1 | 12/2018 |
| KR | 10-2019-0012675 A | 2/2019 |
| RU | 2 340 051 C1 | 11/2008 |
| RU | 2 562 813 C2 | 9/2015 |

OTHER PUBLICATIONS

International Search Report dated May 25, 2020, issued in International Application No. PCT/KR2020/002415.
Extended European Search Report dated Feb. 21, 2022, issued in European Patent Application No. 20759948.1.
Russian Office Action dated Mar. 10, 2022, issued in Russian Patent Application No. 2021127249/07.
Korean Office Action dated Jul. 4, 2022, issued in Korean Patent Application No. 10-2020-0087056.
Extended European Search Report dated Jan. 19, 2023, issued in European Application No. 22200587.8 - 1224.
Korean Office Action dated Feb. 24, 2023, issued in Korean Patent Application No. 10-2020-0087056.
Korean Notice of Allowance dated Jun. 29, 2023, issued in Korean Application No. 10-2020-0087056.
Chinese Office Action dated Dec. 29, 2023, issued in Chinese Patent Application No. 202080028270.7.

* cited by examiner

ELECTRONIC DEVICE INCLUDING ANTENNA DEVICE

CROSS-REFERENCE TO RELATED APPLICATION(S)

This application is a continuation application of prior application Ser. No. 17/957,631, filed on Sep. 30, 2022, which is a continuation application of prior application Ser. No. 17/459,165, filed on Aug. 27, 2021, which has issued as U.S. patent Ser. No. 11/462,818 on Oct. 4, 2022 and which is a continuation application of prior application Ser. No. 16/794,859, filed on Feb. 19, 2020, which has issued as U.S. Pat. No. 11,139,554 on Oct. 5, 2021 and is based on and claims priority under 35 U.S.C. § 119(a) of a Korean patent application number 10-2019-0019551, filed on Feb. 19, 2019, in the Korean Intellectual Property Office, and of a Korean patent application number 10-2019-0078718, filed on Jul. 1, 2019, in the Korean Intellectual Property Office, the disclosure of each of which is incorporated by reference herein in its entirety.

BACKGROUND

1. Field

The disclosure relates to electronic devices with an antenna device.

2. Description of Related Art

Developing electronic information communication technology integrates various functionalities into a single electronic device. For example, smartphones pack the functionalities of a sound player, imaging device, and scheduler, as well as the communication functionality and, on top of that, may implement more various functions by having applications installed thereon.

The user of an electronic device may search, screen, and obtain more information by accessing a network, but rather than simply using the functionalities or information (e.g., applications) of the electronic device. Direct access to the network (e.g., wired communication) may enable quick and stable communication establishment but its usability may be limited to a fixed location or space. Wireless network access is less limited in location or space, delivers such a level of speed and stability as approaches those of direct network access, and is expected to be able to establish communication faster and more stable than direct network access.

As smartphones or other personal/portable communication devices spread, users' demand for portability and use convenience is on the rise. For example, foldable or rollable electronic devices may be easy to carry and deliver an enhanced multimedia environment, with their larger screen.

The above information is presented as background information only to assist with an understanding of the disclosure. No determination has been made, and no assertion is made, as to whether any of the above might be applicable as prior art with regard to the disclosure.

SUMMARY

It may be hard to secure communication environments in different frequency bands in a compact electronic device. For example, an independent operation environment (e.g., a sufficient space) needs to be provided for each antenna, but this may be impossible to attain in such a small electronic device. Foldable or rollable electronic devices have a further shrunken structure or space for placing antennas. The housing is thinned down for more flexibility and thus fails to provide a space large enough to arrange antennas. In an embodiment, a foldable or rollable electronic device may experience a change in the operation environment of the antenna when rolled or folded. For example, the arrangement of structures around the antenna may be altered in the folded or rolled state, and so is the operation performance of the antenna.

Aspects of the disclosure are to address at least the above-mentioned problems and/or disadvantages and to provide at least the advantages described below. Accordingly, an aspect of the disclosure is to provide an electronic device with an antenna device, which delivers a stable operation performance even when the structures are folded or rolled.

Another aspect of the disclosure is to provide an electronic device with an antenna device, which may be easily equipped in a slim, compact structure and deliver a stable operation performance.

Another aspect of the disclosure is to provide an electronic device with a plurality of first and second connection members for electrical connection between a switching unit and each radiation conductor (e.g., antennas) arranged in structures.

Another aspect of the disclosure is to provide an electronic device with an antenna device, which delivers a stable operation performance according to a hand grip on the structures in the folded or unfolded state of the structures.

Additional aspects will be set forth in part in the description which follows and, in part, will be apparent from the description, or may be learned by practice of the presented embodiments.

In accordance with an aspect of the disclosure, an electronic device with an antenna device is provided. The electronic device includes a first housing structure including a first surface facing in a first direction, a second surface facing in a second direction opposite to the first direction, and a first side surface member at least partially surrounding a space between the first surface and the second surface, the first housing structure at least partially formed of an electrically conductive material; a second housing structure including a third surface facing in a third direction, a fourth surface facing in a fourth direction opposite to the third direction, and a second side surface member at least partially surrounding a space between the third surface and the fourth surface, the second housing structure at least partially formed of an electrically conductive material; a hinge structure configured to rotatably connect the first housing structure and the second housing structure and provide a folding axis on which the first housing structure and the second housing structure rotate; and at least one printed circuit board disposed between the first surface and the second surface or between the third surface and the fourth surface. The first side surface member and the second side surface member includes a first side surface portion disposed in parallel with the folding axis, a second side surface portion extending from an end of the first side surface portion in a direction crossing the folding axis, a third side surface portion extending from another end of the first side surface portion in parallel with the folding axis, a fourth side surface portion connected with the third side surface portion and extending from the third side surface portion in a direction crossing the folding axis, a fifth side surface portion connecting the second side surface portion and the fourth side surface portion and extending in parallel with the folding axis, the fifth side surface portion disposed adjacent to the hinge structure, a first slit formed between an end of the first side surface portion and the second side surface portion, a second slit formed between the second side surface portion and the fifth side surface portion, a third slit formed between another end of the first side surface portion and the third side surface portion, and a fourth slit formed between the third side surface portion and the fourth side surface portion, and a fifth slit formed between the fourth side surface portion and the fifth side surface portion. At least part of at least one of the second side surface portion, the third side surface portion, and the fourth side surface portion is formed of a radiation conductor and is electrically connected to the printed circuit board.

In accordance with another aspect of the disclosure, an electronic device with an antenna device is provided. The electronic device includes a first housing structure including a first surface facing in a first direction, a second surface facing in a second direction opposite to the first direction, and a first side surface member at least partially surrounding a space between the first surface and the second surface, the first housing structure at least partially formed of an electrically conductive material; a second housing structure including a third surface facing in a third direction, a fourth surface facing in a fourth direction opposite to the third direction, and a second side surface member at least partially surrounding a space between the third surface and the fourth surface, the second housing structure at least partially formed of an electrically conductive material; a hinge structure configured to rotatably connect the first housing structure and the second housing structure and provide a folding axis on which the first housing structure and the second housing structure rotate; and at least one printed circuit board disposed between the first surface and the second surface or between the third surface and the fourth surface. The first side surface member includes a first side surface portion disposed in parallel with the folding axis; a second side surface portion extending from an end of the first side surface portion in a direction crossing the folding axis; a third side surface portion extending from another end of the first side surface portion in parallel with the folding axis; a fourth side surface portion connected with the third side surface portion and extending from the third side surface portion in a direction crossing the folding axis; a fifth side surface portion connecting the second side surface portion and the fourth side surface portion and extending in parallel with the folding axis, the fifth side surface portion disposed adjacent to the hinge structure; a first slit formed between an end of the first side surface portion and the second side surface portion; a second slit formed between the second side surface portion and the fifth side surface portion; a third slit formed between another end of the first side surface portion and the third side surface portion; a fourth slit formed between the third side surface portion and the fourth side surface portion; and a fifth slit formed between the fourth side surface portion and the fifth side surface portion. The second side surface member includes a sixth side surface portion disposed in parallel with the folding axis; a seventh side surface portion extending from an end of the sixth side surface portion in a direction crossing the folding axis; an eighth side surface portion extending from another end of the sixth side surface portion in parallel with the folding axis; a ninth side surface portion connected with the eighth side surface portion and extending from the eighth side surface portion in a direction crossing the folding axis; a tenth side surface portion connecting the seventh side surface portion and the ninth side surface portion and extending in parallel with the folding axis, the tenth side surface portion disposed adjacent to the hinge structure; a sixth slit formed between an end of the sixth side surface portion and the seventh side surface portion; a seventh slit formed between the seventh side surface portion and the tenth side surface portion; an eighth slit formed between another end of the sixth side surface portion and the eighth side surface portion; a ninth slit formed between the eighth side surface portion and the ninth side surface portion; and a tenth slit formed between the ninth side surface portion and the tenth side surface portion. At least part of at least one of the second side surface portion, the third side surface portion, and the fourth side surface portion is formed of a radiation conductor provided as an antenna and is electrically connected to the printed circuit board, and at least part of at least one of the seventh side surface portion, the eighth side surface portion, and the ninth side surface portion is formed of a radiation conductor provided as an antenna and is electrically connected to the printed circuit board.

In accordance with another aspect of the disclosure, an electronic device with an antenna device is provided. The electronic device includes a first housing structure including a first side surface member, a second housing structure including a second side surface member, and a hinge structure rotatably connecting the first housing structure and the second housing structure and providing a folding axis on which the first housing structure and the second housing structure rotate. The first side surface member includes at least one first radiation conductor and at least one second radiation conductor. The second side surface member includes at least one third radiation conductor and at least one fourth radiation conductor. A plurality of first connection members are disposed in at least part of the first housing structure to electrically connect the at least one first radiation conductor and the at least one second radiation conductor with a switching unit disposed in the first housing structure, and a plurality of second connection members are disposed in at least part of the first and second housing structures and at least part of the hinge structure to electrically connect the at least one third radiation conductor and the at least one fourth radiation conductor with the switching unit.

According to various embodiments, in an electronic device with an antenna device, at least part of a first and second side surface member of the electronic device may be formed of a radiation conductor provided as an antenna. Thus, a stable operation performance (e.g., radiation efficiency) may be achieved in the unfolded state of the electronic device. Further, when the user makes a call with the electronic device in his hand (e.g., hand grip), deterioration of the radiation performance due to the user's body may be reduced. For example, even in the folded state of the electronic device, the radiation conductors formed in the first and second side surface members are exposed from the side surfaces of the electronic device to the external space, allowing the radiation conductors to stably transmit/receive radio waves. As another example, the radiation conductor may implement at least part of the first and second side surface member as an antenna, enabling easier placement even in a slim, compact structure.

According to various embodiments, in the unfolded state or folded state of the first and second housing structures in the plurality of housings and hinge structure supporting one display, a plurality of first and second connection members (e.g., coaxial cables, flexible printed circuit boards (FPCBs), micro strip lines, or strip lines) for connecting at least one first to fourth radiation conductor and a switching unit included in the electronic device are formed, providing a better electrical connection between the switching unit and the at least one first to fourth radiation conductor and hence enhancing the antenna function of the at least one first to fourth radiation conductor.

According to various embodiments, in the folded state or unfolded state of the first and second housing structures, switching among the first to fourth radiation conductors may be rendered according to the hand grip of the first and second housing structures, enabling stable transmission/reception and resultantly allowing the antenna device stable radiation performance.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
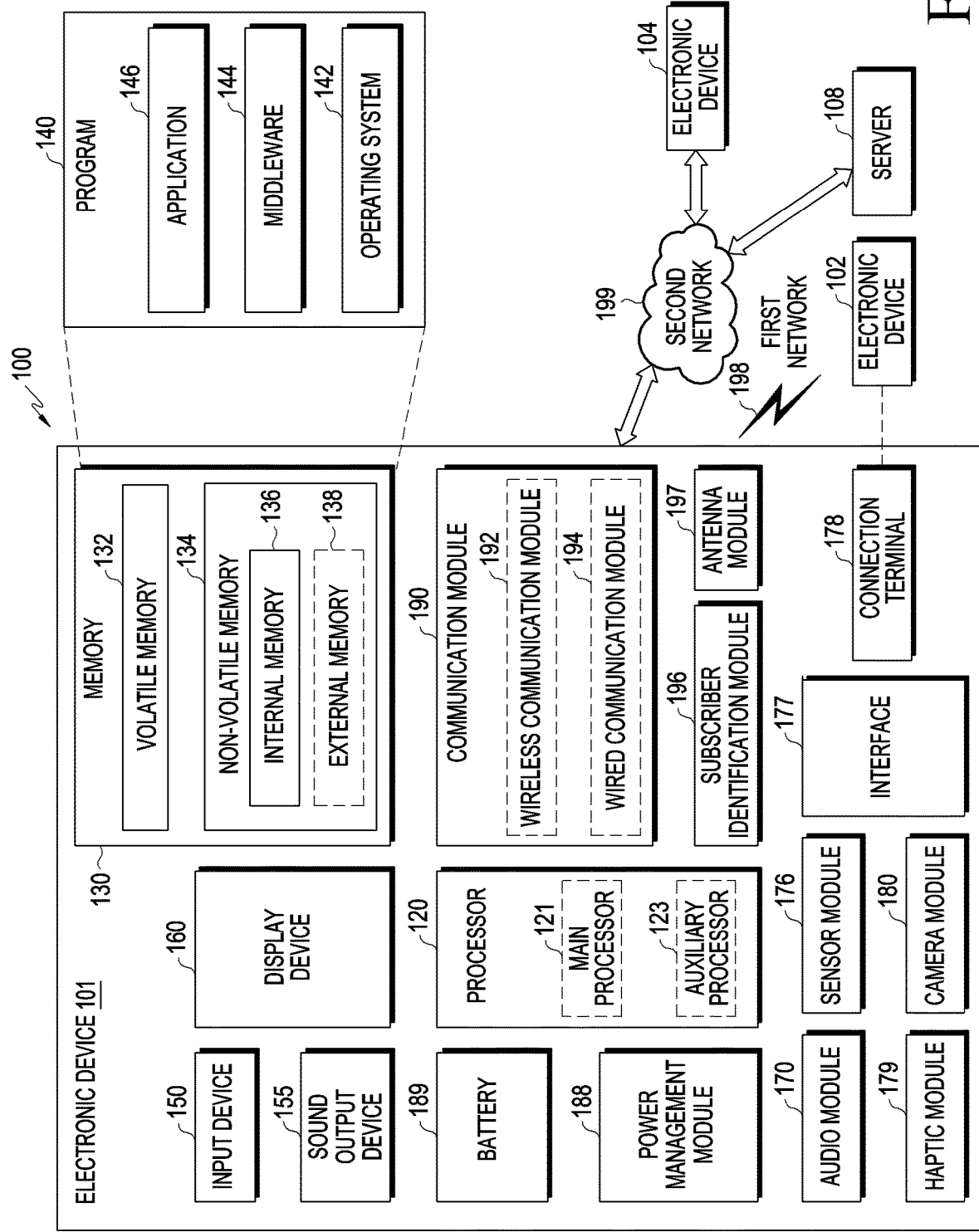
FIG. 1 is a block diagram illustrating an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various changes may be made to the disclosure, and the disclosure may come with a diversity of embodiments. Some embodiments of the disclosure are shown and described in connection with the drawings. However, it should be appreciated that the disclosure is not limited to the embodiments, and all changes and/or equivalents or replacements thereto also belong to the scope of the disclosure.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. The terms coming with ordinal numbers such as 'first' and 'second' may be used to denote various components, but the components are not limited by the terms. The terms are used to distinguish one component from another. For example, a first component may be denoted a second component, and vice versa without departing from the scope of the disclosure. The term "and/or" may denote a combination(s) of a plurality of related items as listed or any of the items. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The terms "front," "rear surface," "upper surface," and "lower surface" are relative ones that may be varied depending on directions in which the figures are viewed, and may be replaced with ordinal numbers such as "first" and "second." The order denoted by the ordinal numbers, first and second, may be varied as necessary.

The terms as used herein are provided merely to describe some embodiments thereof, but not to limit the disclosure. As used herein, the singular forms "a," "an," and "the" are intended to include the plural forms as well, unless the context clearly indicates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "electronic device" may be any device with a touch panel, and the electronic device may also be referred to as a terminal, a portable terminal, a mobile terminal, a communication terminal, a portable communication terminal, a portable mobile terminal, or a display apparatus.

For example, the electronic device may be a smartphone, a mobile phone, a navigation device, a game device, a TV, a head unit for vehicles, a laptop computer, a tablet computer, a personal media player (PMP), or a personal digital assistant (PDA). The electronic device may be implemented as a pocket-sized portable communication terminal with a radio communication function. According to an embodiment of the disclosure, the electronic device may be a flexible device or a flexible display.

The electronic device may communicate with an external electronic device, e.g., a server, or may perform tasks by interworking with such an external electronic device. For example, the electronic device may transmit an image captured by a camera and/or location information detected by a sensor to a server through a network. The network may include, but is not limited to, a mobile or cellular communication network, a local area network (LAN), a wireless local area network (WLAN), a wide area network (WAN), the Internet, or a small area network (SAN).

FIG. 1 is a block diagram illustrating an electronic device 101 in a network environment 100 according to an embodiment of the disclosure.

Referring to FIG. 1, the electronic device 101 in the network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the displays, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an external electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the external electronic device 102, the external electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
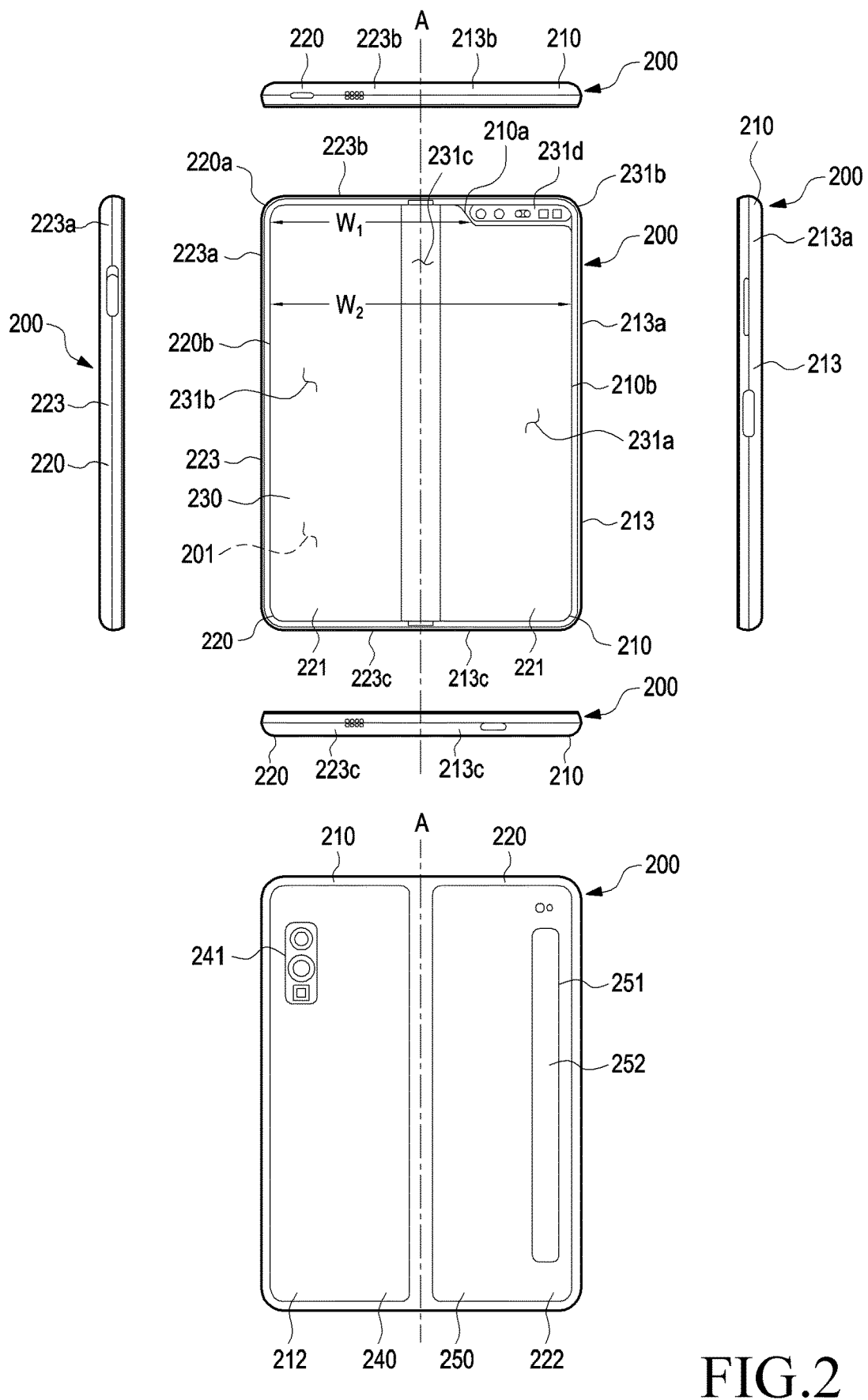
FIG. 2 is a view illustrating an electronic device in an unfolded state according to an embodiment of the disclosure.

FIG. 2 is a view illustrating an electronic device 200 in an unfolded state according to an embodiment of the disclosure.

Figure 3:
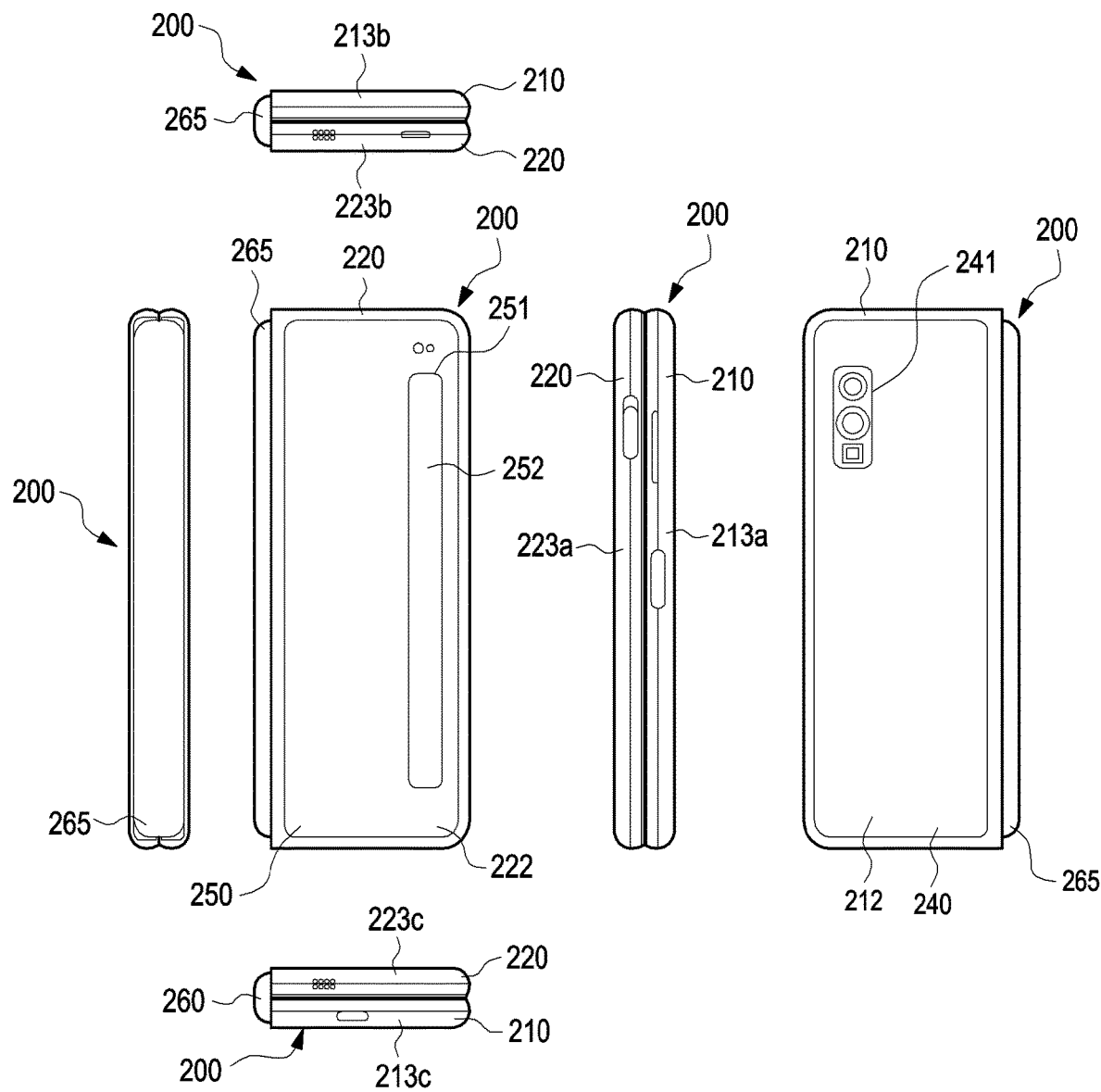
FIG. 3 is a view illustrating the electronic device of FIG. 2, in a folded state, according to an embodiment of the disclosure.

FIG. 3 is a view illustrating the electronic device 200 of FIG. 2, in a folded state, according to an embodiment of the disclosure.

The electronic device 200 of FIGS. 2 and 3 may be at least partially similar to the electronic device 101 of FIG. 1 or may include other features.

Referring to FIG. 2, an electronic device 200 may include a pair of housing structures 210 and 220 coupled together via a hinge structure (e.g., the hinge structure 264 of FIG. 4) to be rotatable to fold to each other, a hinge cover 265 covering foldable portions of the pair of housing structures 210 and 220, and a display 230 (e.g., a flexible display or foldable display) disposed in a space formed by the pair of housing structures 210 and 220. According to an embodiment, the hinge cover 265 may be part of the hinge structure 264. According to an embodiment, the electronic device 200 may include a foldable housing rotatably coupled from the position in which the pair of housing structures 210 and 220 are folded to face each other to the position in which the pair of housing structures 210 and 220 are positioned side by side. In the disclosure, the surface where the display 230 is in may be defined as a 'front surface' of the electronic device 200, and its opposite surface may be defined as a 'back surface' of the electronic device 200. The surface surrounding the space between the front and back surfaces may be defined as a 'side surface' of the electronic device 200.

According to an embodiment, the pair of housing structures 210 and 220 may include a first housing structure 210 with a sensor area 231d, a second housing structure 220, a first back cover 240, and a second back cover 250. The pair of housing structures 210 and 220 of the electronic device 200 are not limited to the shape and coupling shown in FIGS. 2 and 3 but may rather be implemented in other shapes or via a combination and/or coupling of other components. For example, the first housing structure 210 and the first back cover 240 may be integrally formed with each other, and the second housing structure 220 and the second back cover 250 may be integrally formed with each other.

According to an embodiment, the first housing structure 210 and the second housing structure 220 may be positioned on opposite sides of a first axis, e.g., a folding axis A, and they may be overall symmetrical in shape with each other with respect to the folding axis A. According to an embodiment, the first housing structure 210 and the second housing structure 220 may be rotated on the hinge structure 264 or hinge cover 265 with respect to different folding axes. For example, the first housing structure 210 and the second housing structure 220 each may be rotatably coupled to the hinge structure 264 or the hinge cover 265, and the first housing structure 210 and the second housing structure 220 may be rotated on the folding axis A or different folding axes from the position where they are folded together to the position where they are inclined or positioned side-by-side with respect to each other.

As used herein, when A and B are positioned or extend side-by-side, it may mean that A and B are positioned at least partially next to each other or at least partially in parallel with each other. According to an embodiment, when A and B are disposed (or arranged) side-by-side, it may mean that A and B are disposed (or arranged) to face in the same direction or directions parallel with each other. In the following description, although the example phrases "side-by-side" and "in parallel with each other" may be used to describe the corresponding structures, the shape or arrangement of the structures may easily be appreciated from the accompanying drawings.

According to an embodiment, the first housing structure 210 and the second housing structure 220 may form different angles or distances depending on whether the electronic device 200 is in an unfolded state (or flat state, or open state)

or folded state (or folding state), or in a state therebetween. According to an embodiment, the first housing structure 210 and the second housing structure 220 may be symmetrical in shape except that the first housing structure 210 further includes a sensor area 231d where various sensors are arranged. Alternatively, the sensor area 231d may be disposed in at least a portion of the second housing structure 220, not the first housing structure 210, or another sensor area may be included in the second housing structure 220.

According to an embodiment, in the unfolded state of the electronic device 200, the first housing structure 210 may be connected to the hinge structure (e.g., the hinge structure 264 of FIG. 4) and may include a first surface 211 disposed to face the front surface of the electronic device 200, a second surface 212 facing away from the first surface 211, and a first side surface member 213 surrounding at least a portion of the space between the first surface 211 and the second surface 212. According to an embodiment, the first side surface member 213 may include a first side surface 213a disposed in parallel with the folding axis A, a second side surface 213b extending from one end of the first side surface 213a in a direction perpendicular to the folding axis A, and a third side surface 213c extending from the other end of the first side surface 213a in a direction perpendicular to the folding axis A. As used herein, the term "perpendicular" or "parallel" may be interchangeably used with "partially perpendicular" or "partially parallel." In some embodiments, "parallel" or "perpendicular" may also mean "inclined in an angle range within 10 degrees."

According to an embodiment, the second housing structure 220 may be connected to the hinge structure (e.g., the hinge structure 264 of FIG. 4) and, in the unfolded state of the electronic device 200, the second housing structure 220 may include a third surface 221 disposed to face the front surface of the electronic device 200, a fourth surface 222 facing away from the third surface 221, and a second side surface member 223 surrounding at least a portion of the space between the third surface 221 and the fourth surface 222. According to an embodiment, the second side surface member 223 may include a fourth side surface 223a disposed in parallel with the folding axis A, a fifth side surface 223b extending from one end of the fourth side surface 223a in a direction perpendicular to the folding axis A, and a sixth side surface 223c extending from the other end of the fourth side surface 223a in a direction perpendicular to the folding axis A. According to an embodiment, the third surface 221, in the folded state, may be disposed to face the first surface 211. According to an embodiment, the second side surface member 223 may be formed in substantially the same shape or material as the first side surface member 213 although they may partially differ in their specific shapes.

According to an embodiment, the electronic device 200 may include a recess 201 to receive the display 230 via a structural shape combination of the first housing structure 210 and the second housing structure 220. The recess 201 may have substantially the same size as the display 230. According to an embodiment, due to the sensor area 231d, the recess 201 may have two or more different widths in the direction perpendicular to the folding axis A. For example, the recess 201 may have a first width W1 between a first portion 220a, parallel with the folding axis A, of the second housing structure 220, and a first portion 210a, formed at an edge of the sensor area 231d, of the first housing structure 210 and a second width W2 formed by a second portion 220b of the second housing structure 210 and a second portion 210b, which is parallel with the folding axis A and does not correspond to the sensor area 231d, of the first housing structure 210. In this case, the second width W2 may be larger than the first width W1. For example, the recess 201 may be formed with the first width W1 between the first portion 210a of the first housing structure 210 and the first portion 220a of the second housing structure 220, which are asymmetrical in shape with each other, and the second width W1 between the second portion 210b of the first housing structure 210 and the second portion 220b of the second housing structure 220, which are symmetrical in shape with each other. According to an embodiment, the first portion 210a and second portion 210b of the first housing structure 210 may be formed to have different distances from the folding axis A. The width of the recess 201 is not limited thereto. According to an embodiment, the recess 201 may have two or more different widths depending on the shape of the sensor area 231d or the asymmetrical shape portions of the first housing structure 210 and the second housing structure 220.

According to an embodiment, the first housing structure 210 and the second housing structure 220 may at least partially be formed of a metal or non-metallic material with a rigidity selected to support the display 230. According to an embodiment, the first housing structure 210 and the second housing structure 220 may at least partially include an electrically conductive material. When the first housing structure 210 and the second housing structure 220 include an electrically conductive material, the electronic device 200 may transmit/receive radio waves via the electrically conductive portions of the first housing structure 210 and the second housing structure 220. For example, the processor (e.g., the processor 120 of FIG. 1) or communication module (e.g., the communication module 190) of the electronic device 200 may perform wireless communication using a portion of the first housing structure 210 and the second housing structure 220.

According to an embodiment, the sensor area 231d may be formed adjacent to one corner of the first housing structure 210 and to have a predetermined area. However, the placement, shape, or size of the sensor area 231d is not limited to that shown in the drawings. For example, according to an embodiment, the sensor area 231d may be provided in a different corner of the first housing structure 210 or in any area between the top corner and the bottom corner. According to an embodiment, the sensor area 231d may be disposed in at least an area of the second housing structure 220. According to an embodiment, the sensor area 231d may be disposed to extend to the first housing structure 210 and the second housing structure 220. According to an embodiment, the electronic device 200 may include components exposed from its front surface through the sensor area 231d or one or more openings prepared in the sensor area 231d and may perform various functions by way of the components. The components arranged in the sensor area 231d may include at least one of, e.g., a front camera device (e.g., the camera module 180 of FIG. 1), a receiver (e.g., the audio module 170 of FIG. 1), a proximity sensor, an illuminance sensor, an iris recognition sensor, an ultrasonic sensor (e.g., the sensor module 176 of FIG. 1), or an indicator.

According to an embodiment, the first back cover 240 may be disposed on the second surface 212 of the first housing structure 210 and may have a substantially rectangular periphery. According to an embodiment, the periphery of the first back cover 240 may be at least partially surrounded by the first housing structure 210. Similarly, the second back cover 250 may be disposed on the fourth surface 222 of the second housing structure 220 and its periphery may be at least partially surrounded by the second housing structure 220.

In the shown embodiment, the first back cover 240 and the second back cover 250 may be substantially symmetrical in shape with respect to the folding axis A. According to an embodiment, the first back cover 240 and the second back cover 250 may have other various different shapes. According to an embodiment, the first back cover 240 may be integrally formed with the first housing structure 210, and the second back cover 250 may be integrally formed with the second housing structure 220.

According to an embodiment, a combined structure of the first back cover 240, the second back cover 250, the first housing structure 210, and the second housing structure 220 may provide a space where various components (e.g., a printed circuit board, antenna module, sensor module, or battery) of the electronic device 200 may be arranged. According to an embodiment, one or more components may be arranged or visually exposed on/through the back surface of the electronic device 200. For example, one or more components or sensors may be visually exposed through a first back surface area 241 of the first back cover 240. According to an embodiment, the sensor may include a proximity sensor, a rear camera device, and/or flash. According to an embodiment, a sub display 252 may be at least visually exposed through a second back surface area 251 of the second back cover 250.

The display 230 may be disposed in a space formed by the pair of housing structures 210 and 220. For example, the display 230 may be seated in a recess (e.g., the recess 201 of FIG. 2) formed by the pair of housing structures 210 and 220, and the display 230 may be disposed to occupy substantially most of the front surface of the electronic device 200. For example, the front surface of the electronic device 200 may include the display 230, a partial area (e.g., an edge area) of the first housing structure 210, which is adjacent to the display 230, and a partial area (e.g., an edge area) of the second housing structure 220. According to an embodiment, the back surface of the electronic device 200 may include the first back cover 240, a partial area (e.g., an edge area) of the first housing structure 210, which is adjacent to the first back cover 240, the second back cover 250, and a partial area (e.g., an edge area) of the second housing structure 220, which is adjacent to the second back cover 250.

According to an embodiment, the display 230 may mean a display at least a portion of which may be transformed to be flat or curved. According to an embodiment, the display 230 may include a folding area 231c, a first area 231a disposed on one side of the folding area 231c (e.g., a right-hand area of the folding area 231c), and a second area 231b disposed on the opposite side of the folding area 231c (e.g., a left-hand area of the folding area 231c). For example, the first area 231a may be disposed on the first surface 211 of the first housing structure 210, and the second area 231b may be disposed on the third surface 221 of the second housing structure 220. For example, the display 230 may extend from the first surface 211 through the hinge structure 264 of FIG. 3 to the third surface, and its area (e.g., the folding area 231c) corresponding to, at least, the hinge structure may be a flexible area that may transform from flat to curved.

According to an embodiment, the segmentation of the display 230 is merely an example, and the display 230 may be divided into a plurality of (e.g., four or more or two) areas depending on the structure or function of the display 230. As an example, in the embodiment shown in FIG. 2, the folding area 231c may extend in the vertical axis (e.g., the Y axis of FIG. 4) parallel with the folding axis A, and the area of the display 230 may be divided by the folding area 231c or the folding axis A. In another embodiment, the area of the display 230 may be divided by another folding portion (e.g., a folding area parallel with the horizontal axis (e.g., the X axis of FIG. 4) or another folding axis (e.g., a folding axis parallel with the X axis of FIG. 4). The above-described area segmentation is merely physical segmentation by the pair of housing structures 210 and 220 and hinge structure (e.g., the hinge structure 264 of FIG. 4) and, substantially, the display 230 may display a single whole screen via the pair of housing structures 210 and 220 and the hinge structure (e.g., the hinge structure 264 of FIG. 4).

According to an embodiment, the first area 231a and the second area 231b may be overall symmetrical in shape with respect to the folding area 231c. However, unlike the second area 231b, the first area 231a may include a notch area (e.g., the notch area 233 of FIG. 4) that provides the sensor area 231d and, in the remaining area, be symmetrical in shape with the second area 231b. For example, the first area 231a and the second area 231b may include symmetrical portions and asymmetrical portions.

Figure 4:
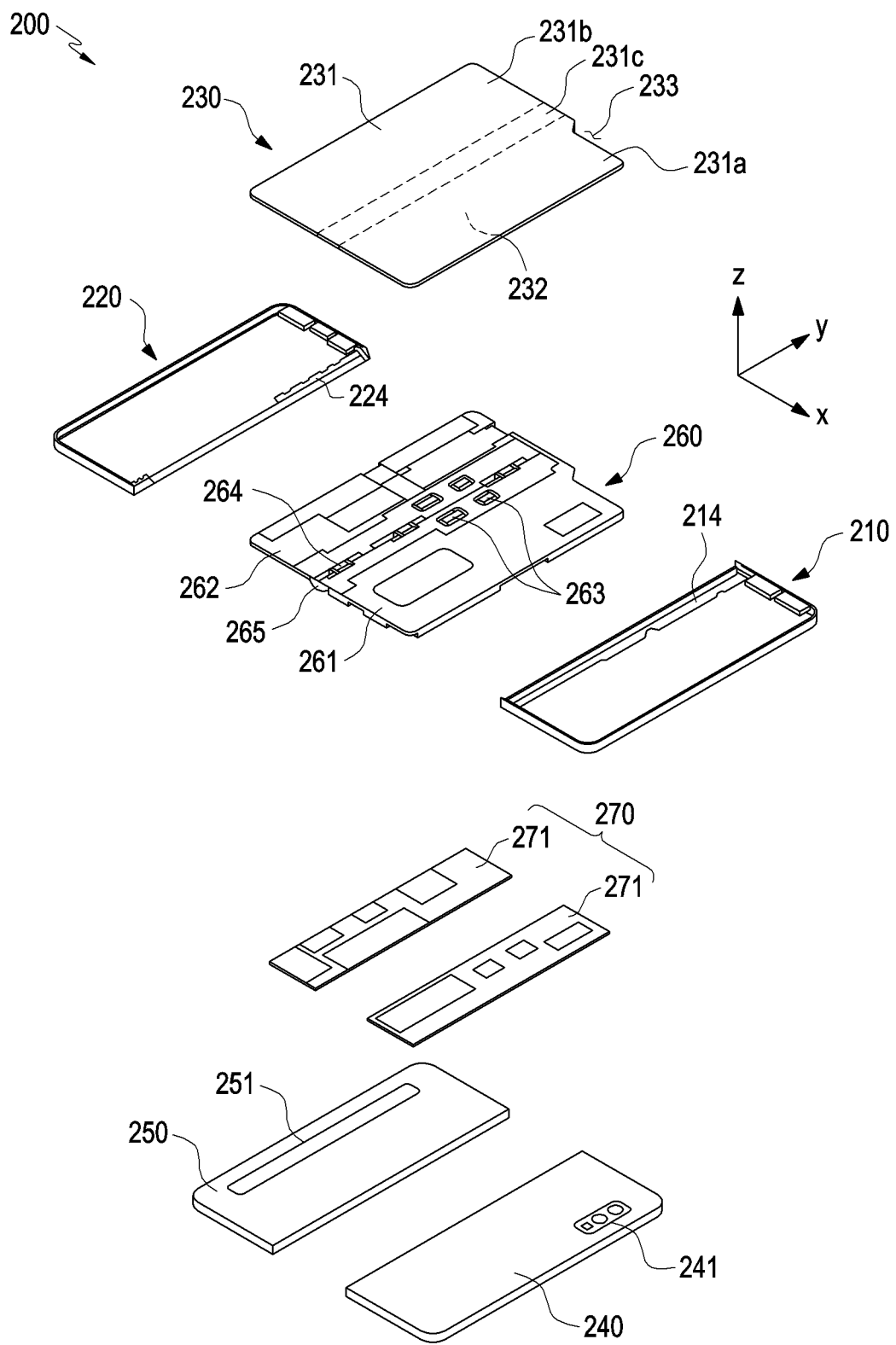
FIG. 4 is an exploded perspective view illustrating an electronic device according to an embodiment of the disclosure.

Referring to FIG. 3, the hinge cover 265 may be disposed between the first housing structure 210 and the second housing structure 220 to hide the internal components (e.g., the hinge structure 264 of FIG. 4). For brevity of description, the hinge cover 265 is provided separately from the hinge structure 264 but, as mentioned above, the hinge cover 265 may be part of the hinge structure 264 while partially forming the outer appearance of the electronic device 200. According to an embodiment, the hinge cover 265 may be hidden by a portion of the first housing structure 210 and second housing structure 220 or be exposed to the outside depending on the operation state (e.g., the unfolded state or folded state) of the electronic device 200.

As an example, as shown in FIG. 2, in the unfolded state of the electronic device 200, the hinge cover 265 may be hidden, and thus not exposed, by the first housing structure 210 and the second housing structure 220. As another example, as shown in FIG. 3, in the folded state (e.g., the completely folded state) of the electronic device 200, the hinge cover 265 may be exposed to the outside between the first housing structure 210 and the second housing structure 220. As another example, in an intermediate state of the electronic device 200, in which the first housing structure 210 and the second housing structure 220 are folded with a certain angle, a portion of the hinge cover 265 may be exposed to the outside of the electronic device 200 between the first housing structure 210 and the second housing structure 220. In this case, the exposed area may be smaller than when the electronic device 200 is in the folded state. According to an embodiment, the hinge cover 265 may include a curved surface.

Described below are the operation of the first housing structure 210 and the second housing structure 220 and each area of the display 230 depending on the operation state (e.g., the unfolds state and folded state) of the electronic device 200.

According to an embodiment, when the electronic device 200 is in the unfolded state (e.g., the state as shown in FIG. 2), the first housing structure 210 and the second housing structure 220 are 180-degree angled therebetween, and the first area 231a and second area 231b of the display may be placed to face in the same direction, e.g., display screen in the same direction, e.g., in directions parallel with each other. The folding area 231c may be flush with the first area 231a and the second area 231b.

According to an embodiment, when the electronic device 200 is in the folded state (e.g., the state as shown in FIG. 3), the first housing structure 210 and the second housing structure 220 may face each other. For example, in the folded state (e.g., the state as shown in FIG. 3) of the electronic device 200, the first area 231a and the second area 231b of the display 230 may be rendered to face each other, angled at a small angle (e.g., from 0 degrees to 10 degrees) therebetween. In the folded state (e.g., the state as shown in FIG. 3) of the electronic device 200, the folding area 231c may at least partially form a curved surface with a predetermined curvature.

According to an embodiment, when the electronic device 200 is in an intermediate state, the first housing structure 210 and the second housing structure 220 may be angled therebetween at a certain angle. For example, in the intermediate state, the first area 231a and second area 231b of the display 230 may be angled therebetween at an angle larger than the angle when it is in the folded state and smaller than the angle when it is in the unfolded state. The folding area 231c may at least partially have a curved surface with a predetermined curvature and, in this case, the curvature may be smaller than that when it is in the folded state.

FIG. 4 is an exploded perspective view illustrating an electronic device 200 according to an embodiment of the disclosure.

Referring to FIG. 4, an electronic device 200 may include a display 230, a supporting member assembly 260, at least one printed circuit board 270, a first housing structure 210, a second housing structure 220, a first back cover 240, and a second back cover 250. In the disclosure, the display 230 may be interchangeably used with a display module or display assembly.

The display 230 may include a display panel 231 (e.g., a flexible display panel) and one or more plates 232 or layers seated on the display panel 231. According to an embodiment, the plate 232 may be disposed between the display panel 231 and the supporting member assembly 260. The display panel 231 may be disposed on at least a portion of a surface (e.g., the Z-axis facing surface of FIG. 4) of the plate 232. The plate 232 may have a shape corresponding to the display panel 231. For example, a portion of the plate 232 may have a shape corresponding to the shape of the notch area 233 of the display panel 231.

The supporting member assembly 260 may include a first supporting member 261, a second supporting member 262, a hinge structure 264 disposed with the first supporting member 261 and the second supporting member 262, a hinge cover 265 covering the hinge structure 264 when the hinge structure 264 is viewed from the outside, and a wiring member (e.g., a flexible printed circuit board (FPCB)) crossing the first supporting member 261 and the second supporting member 262.

According to an embodiment, the supporting member assembly 260 may be disposed with the plate 232 and at least one printed circuit board 270. As an example, the first supporting member 261 may be disposed with the first area 231a of the display 230 and a first printed circuit board 271. The second supporting member 262 may be disposed with the second area 131b of the display 230 and a second printed circuit board 272.

According to an embodiment, the wiring member 263 and the hinge structure 264 may be at least partially disposed inside the supporting member assembly 260. The wiring member 263 may be disposed in a direction (e.g., the X-axis direction) crossing the first supporting member 261 and the second supporting member 262. The wiring member 263 may be disposed in a direction (e.g., the X-axis direction) perpendicular to the folding axis (e.g., the folding axis A of FIG. 1 or the Y axis).

As mentioned above, the at least one printed circuit board 270 may include the first printed circuit board 271 disposed on the first supporting member 261 and the second printed circuit board 272 disposed on the second supporting member 262. The first printed circuit board 271 and the second printed circuit board 272 may be disposed inside a space formed by the supporting member assembly 260, the first housing structure 210, the second housing structure 220, the first back cover 240, and the second back cover 250. Components, e.g., at least one of the components of FIG. 1, for implementing various functions of the electronic device 200 may be mounted on the first printed circuit board 271 and the second printed circuit board 272.

According to an embodiment, the first housing structure 210 and the second housing structure 220 may be assembled together to be coupled to both sides of the supporting member assembly 260, with the display 230 coupled to the supporting member assembly 260. The first housing structure 210 and the second housing structure 220 may be slidably coupled to two opposite sides of the supporting member assembly 260, e.g., the first supporting member 261 and the second supporting member 262, respectively.

According to an embodiment, the first housing structure 210 may include a first rotation supporting surface 214 (e.g., the fourth side surface portion 514 of FIG. 5, described below), and the second housing structure 520 may include a second rotation supporting surface 224 (e.g., the eighth side surface 523 of FIG. 5, described below) corresponding to the first rotation supporting surface 214. The first rotation supporting surface 214 and the second rotation supporting surface 224 may include a curved surface corresponding to a curved surface included in the hinge cover 265.

According to an embodiment, when the electronic device 200 is in the unfolded state (e.g., the state as shown in FIG. 2), the first rotation supporting surface 214 and the second rotation supporting surface 224 may cover the hinge cover 265, allowing the hinge cover 265 to be not or minimally exposed to the back surface of the electronic device 200. According to an embodiment, when the electronic device 200 is the folded state (e.g., the state as shown in FIG. 3), the first rotation supporting surface 214 and the second rotation supporting surface 224 may rotate along the curved surface of the hinge cover 265, maximally exposing the hinge cover 265 to the back surface of the electronic device 200.

In the above description, the ordinal numbers as in the first housing structure 210, second housing structure 220, first side surface member 213 and the second side surface member 223 have been used merely for distinguishing the components, and it should be noted that the scope of the disclosure is not limited by the use of ordinal numbers. For example, although the sensor area 231d is formed in the first housing structure 210 in the above example, the sensor area 231d may be formed in the second housing structure 220 or in each of the first housing structure 210 and the second housing structure 220. According to an embodiment, although the first back surface area 241 and the sub display 252 are disposed in the first back cover 240 and the second back cover 250, respectively, the first back surface area 241 for placing, e.g., a sensor, and the sub display 252 for outputting screen, both, may be disposed in either the first back cover 240 or the second back cover 250.

According to an embodiment, in the plurality of housing structures 210 and 220 and the hinge structure 264 supporting one display 230, an antenna device may be disposed in the first housing structure or the second housing structure. The antenna device is described below in connection with an example configuration in which the antenna device is disposed in the second housing structure. However, as mentioned above, embodiments of the disclosure are not limited thereto and it should be noted that the antenna device may be disposed in the first housing structure of the electronic device, according to an embodiment.

Figure 5:
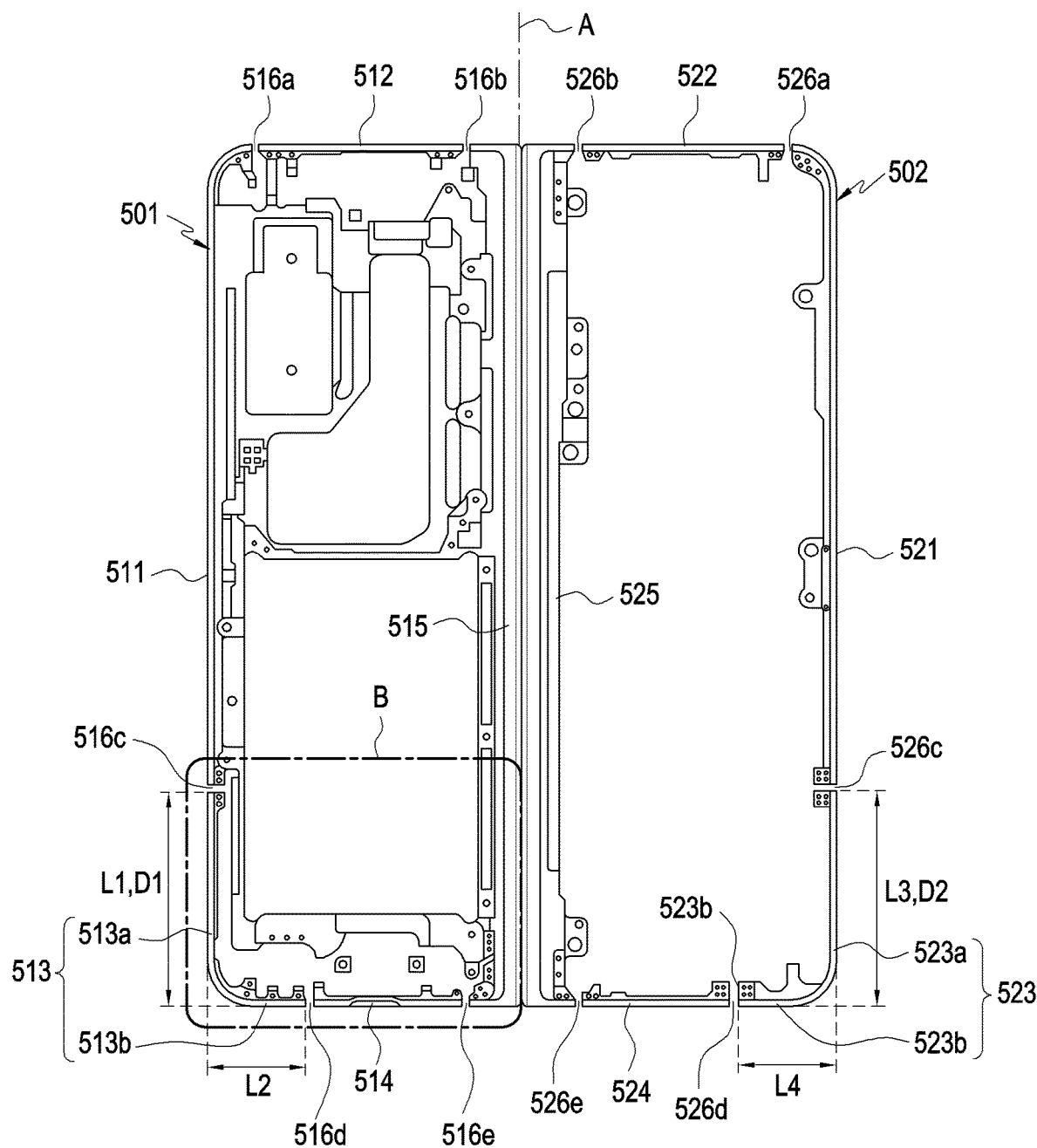
FIG. 5 is a view illustrating a configuration of side surface member(s) in an electronic device according to an embodiment of the disclosure.

FIG. 5 is a view illustrating a configuration of side surface member(s) 501 and 502 in an electronic device (e.g., the electronic device 200 of FIG. 2) according to an embodiment of the disclosure.

Referring to FIG. 5, the side surface members (e.g., the first side surface member 213 and second side surface member 223 of FIG. 4) may include a first side surface member 501 provided as part of the first housing structure 210 of FIG. 2 and a second side surface member 502 provided as part of the second housing structure 220. According to an embodiment, the first side surface member 501 and the second side surface member 502 may be shaped as a frame surrounding the internal space of the housing structures (e.g., the first housing structure 210 and second housing structure 220 of FIG. 2). According to an embodiment, the first side surface member 501 and the second side surface member 502 may have substantially the same structure except for a slight difference in shape. According to an embodiment, the first side surface member 501 and the second side surface member 502 may at least partially include an electrically conductive material. For example, FIG. 5 substantially illustrates the electrically conductive material portions of the first side surface member 501 and the second side surface member 502. The first side surface member 501 and the second side surface member 502 may include a non-conductive material, e.g., an insulating material, allowing their final shape to be a closed curve or loop.

According to an embodiment, the first side surface member 501 may include a first side surface portion 511, a second side surface portion 512, a third side surface portion 513, a fourth side surface portion 514, and/or a fifth side surface portion 515. According to an embodiment, the first to fifth side surface portions 511, 512, 513, 514, and 515 may also be referred to as a 'first to fifth side surface portion partial frame.' According to an embodiment, the first side surface portion 511 may be disposed in parallel with the folding axis A. The second side surface portion 512 may be disposed spaced apart from an end (e.g., the top) of the first side surface portion 511 in a direction crossing the folding area A or substantially perpendicular to the folding area A. The third side surface portion 513 may be disposed spaced apart from the opposite end (e.g., the bottom) of the first side surface portion 511 in parallel with the folding area A.

The fourth side surface portion 514 may be disposed adjacent to an end of the third side surface portion 513 and may be disposed spaced apart from the third side surface portion 513 and may extend to the folding area A in a direction crossing, or in a direction substantially perpendicular. The fifth side surface portion 515 may extend substantially in parallel with the folding area A or the first side surface portion 511. One end of the fifth side surface portion 515 is disposed spaced apart from an end of the second side surface portion 512, and the other end of the fifth side surface portion 515 is disposed spaced apart from an end of the fourth side surface portion 514. According to an embodiment, the fifth side surface portion 515 may be disposed adjacent to the hinge structure or hinge cover (e.g., the hinge structure 264 or hinge cover 265 of FIG. 4) and may extend along the folding area A substantially in parallel with the hinge structure 264 or hinge cover 265.

According to an embodiment, the first side surface member 501 may include a slit(s) 516*a*, 516*b*, 516*c*, 516*d*, and 516*e* at least partially separating the electrically conductive material portions. According to an embodiment, the slit(s) 516*a*, 516*b*, 516*c*, 516*d*, and 516*e* may be filled with a non-conductive material which may be referred to as a 'non-conductive portion' or 'non-conductive material portion' as necessary. A structure formed of an insulating material may be formed in at least part of the area surrounded by the first to fifth side surface portions 511, 512, 513, 514, and 515. According to an embodiment, the slit(s) 516*a*, 516*b*, 516*c*, 516*d*, and 516*e* may be filled with an insulating material. For example, the first side surface member 501 may include a non-conductive portion, a non-conductive material portion, or an insulating material portion that insulates some electrically conductive material portion from the other electrically conductive material portions.

According to an embodiment, the first slit 516*a* may be formed between one end of the first side surface portion 511 and the second side surface portion 512, and the second slit 516*b* may be formed between the second side surface portion 512 and the fifth side surface portion 515. The third slit 516*c* may be formed between the opposite end of the first side surface portion 511 and the third side surface portion 513. The fourth slit 516*d* may be formed between the third side surface portion 513 and the fourth side surface portion 514, and the fifth slit 516*e* may be formed between the fourth side surface portion 514 and the fifth side surface portion 515.

At least part of the second side surface portion 512, the third side surface portion 513, and the fourth side surface portion 514 may be formed of an electrically conductive material. For example, at least part of the second side surface portion 512, the third side surface portion 513, and/or the fourth side surface portion 514 may be formed of a radiation conductor. According to an embodiment, the second side surface portion 512, the third side surface portion 513, and/or the fourth side surface portion 514 may function as an antenna radiator (e.g., a radiation conductor) of the electronic device (e.g., the electronic device 200 of FIG. 2). For example, the processor (e.g., the processor 120 of FIG. 1) or communication module (e.g., the communication module 190) of the electronic device 200 may perform wireless communication using a portion of the second side surface portion 512, the third side surface portion 513, and/or the fourth side surface portion 514.

According to an embodiment, a portion of the first side surface portion 511 (or the fifth side surface portion 515) may be electrically connected to the printed circuit board (e.g., the first printed circuit board 271 of FIG. 4) to be utilized as a radiation conductor. For example, a power supply portion formed in the first side surface portion 511 may be electrically connected to the printed circuit board (e.g., the first printed circuit board 271 of FIG. 4), and a ground portion formed in other position of the first side surface portion 511 may be connected to the printed circuit board (e.g., the first printed circuit board 271 of FIG. 4). The electrically conductive material portion of the first side surface portion 511 may form part of the antenna between the position where the power supply portion is connected and where the ground portion is connected.

According to an embodiment, the third side surface portion 513 may include a first portion 513a and a second portion 513b. For example, the first portion 513a may be formed in a first length L1 along a direction parallel with a first axis (e.g., the folding area A of FIG. 5). The second portion 513b may be connected to the first portion 513a and be formed to be curved. The second portion 513b may be formed in a second length L2 along a direction crossing the first axis (e.g., the folding area A of FIG. 5).

According to an embodiment, the third slit 516c may be formed between the first side surface portion 511 and the third side surface portion 513. According to an embodiment, as the third slit 516c is formed in a position of the first length L1 which is a distance D1 not less than 30 mm and not more than 50 mm (e.g., 40 mm) from the second portion 513b of the third side surface portion 513, it may be operated as a radiation conductor (e.g., the third side surface portion 513) with a radiation performance required by the electronic device (e.g., the electronic device 200 of FIG. 2).

According to an embodiment, the radiation feature depending on the position of the third slit 516c is described below in greater detail with reference to FIG. 13 or 14. The above values regarding the position of the third slit 516c are example values applicable to the electronic device in which the width (e.g., the length along the X-axis direction of FIG. 4) of the second side surface member 502 is 100 mm or less, but it should be noted that embodiments of the disclosure are not limited thereto. For example, the third slit 516c may be formed in a different position than that of the example values considering the resonance frequency to be formed using the radiation conductor or the size of the electronic device to be actually manufactured. For example, the third slit 516c may be formed in the position of the first length L1 which is the distance D1 not less than 30 mm and not more than 50 mm (e.g., 40 mm) from the outer side of the second portion 513b of the third side surface portion 513, thus reducing the radiation performance deterioration of the radiation conductor (e.g., the third side surface portion 513) and the radiation performance deterioration of the radiation conductor (e.g., the third side surface portion 513) due to influence by the user's body when the user makes a call with the electronic device (e.g., the electronic device 200 of FIG. 2) in his hand. As such, the third slit 516c may enhance the radiation performance of the radiation conductor (e.g., the third side surface portion 513).

According to an embodiment, as described above in connection with FIG. 5, the first length L1 of the third side surface portion 513 may be a length (e.g., 40 mm) between 30 mm and 50 mm along the direction parallel with the first axis (e.g., the folding area A of FIG. 5), and the second length L2 of the third side surface portion 513 may be a length (e.g., 18.6 mm) between 8.6 mm and 28.6 mm along the direction crossing the first axis (e.g., the folding area A of FIG. 5).

According to an embodiment, allowing the first length L1 to be larger than the second length L2 may minimize the radiation performance deterioration of the radiation conductor (e.g., the third side surface portion 513) and hence enhance the radiation performance of the radiation conductor (e.g., the third side surface portion 513).

According to an embodiment, the first length L1 may be formed to be identical to be the second length L2. When the electronic device 200 is folded, the eighth side surface portion 523 may be positioned adjacent to the third side surface portion 513. The eighth side surface portion 523 may include a third portion 523a and a fourth portion 523b. When viewed from above the first back cover (e.g., the first back cover 240 of FIG. 2), the third slit 516c may be formed to overlap the eighth slit 526c, and the fourth slit 516d may be formed to overlap the ninth slit 526d. Thus, in the plurality of housing structures 210 and 220 and the hinge structure (e.g., the hinge structure 264 of FIG. 4) supporting one display (e.g., the display 230 of FIG. 4), when the electronic device 200 is folded, an end of the third side surface portion 513 and an end of the eighth side surface portion 523 may be rendered to meet, thereby reducing the radiation performance deterioration of the radiation conductor (e.g., the third side surface portion 513 and the eighth side surface portion 523).

As mentioned above, the ordinal numbers have been used herein simply to distinguish between the components, and embodiments of the disclosure are not limited thereto. For example, the first side surface member 501 may be referred to as a 'second side surface member,' and the fifth side surface portion 515 may be referred to as the 'first side surface portion 511' in other embodiments. For example, although some components are distinguished therebetween by use of ordinal numbers, this is merely for simplicity purposes, and various embodiments of the disclosure should be appreciated by the arrangement and connections of the relevant components.

An example configuration of an antenna device (e.g., 500 of FIG. 6) using the above-described structure of side surface member(s) is described below in greater detail with reference to FIGS. 6 and 7. The configuration shown in FIGS. 6 and 7 may regard an example in which one electrically conductive material portion as insulated by the above-described slits from the other electrically conductive material portions is configured as a radiation conductor. In another embodiment, as described above, a portion of another electrically conductive material portion, e.g., the first side surface portion 511 or the sixth side surface portion 521, which is not shown in FIGS. 6 and 7 may be used to form an antenna device. Or, the third side surface portion 513 or the eighth side surface portion 523 may also be partially used as a radiation conductor. In the following embodiments, the components identical to those in the above embodiments or easy to understand from the description of the above embodiments are denoted with or without the same reference numerals and their detailed description may be skipped.

Figure 6:
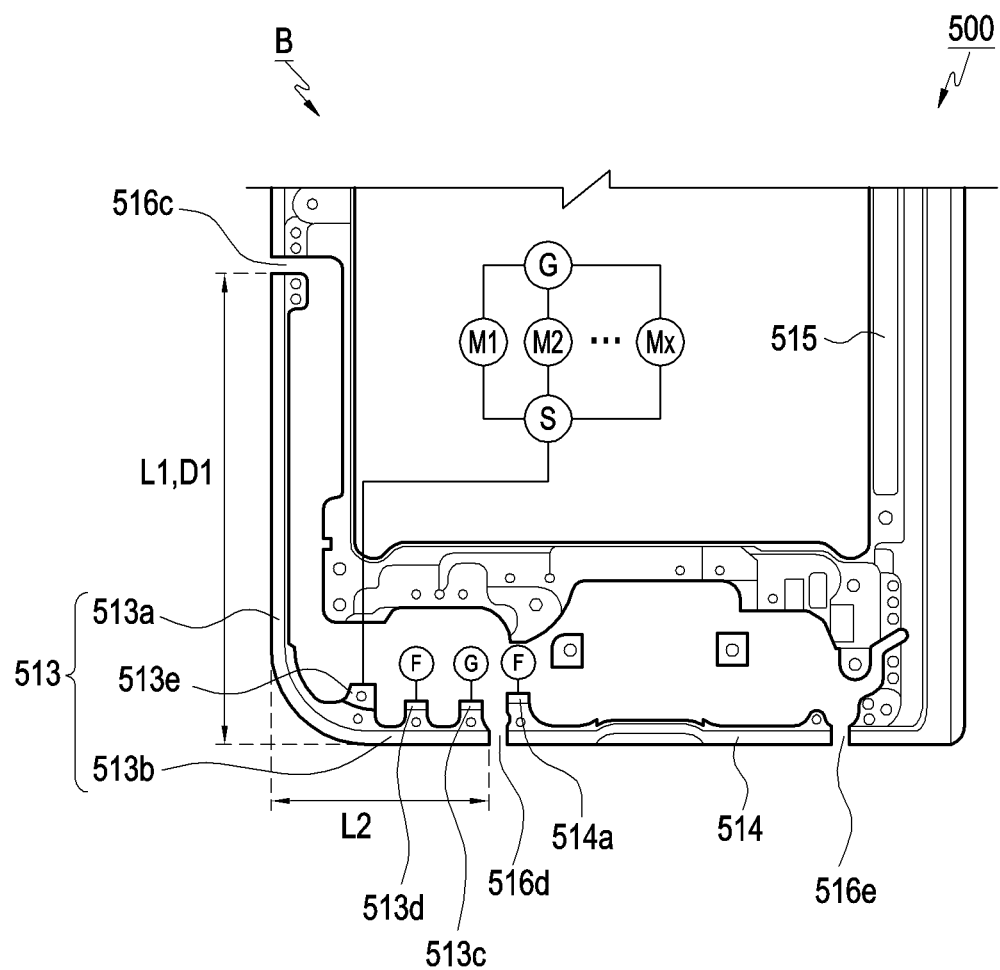
FIG. 6 is an enlarged view of portion B of FIG. 5 according to an embodiment of the disclosure.
Figure 7:
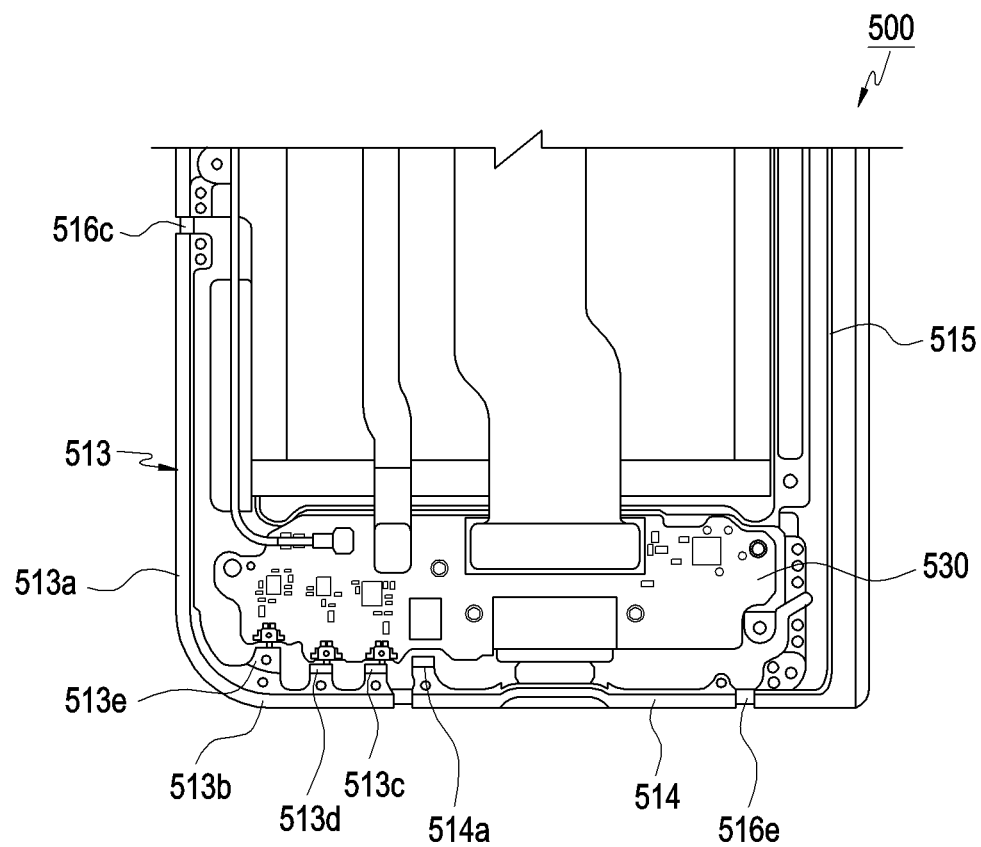
FIG. 7 is a view illustrating a configuration of an antenna device in an electronic device according to an embodiment of the disclosure.

FIGS. 6 and 7 are views illustrating a configuration of an antenna device 500 in an electronic device (e.g., the electronic device 200 of FIG. 1) according to various embodiments of the disclosure.

FIGS. 6 and 7 are enlarged views of portion B of FIG. 5.

Referring to FIGS. 6 and 7, the antenna device 500 may include a first electrically conductive material portion (e.g., a portion of the first side surface portion 511), which is a portion of the first side surface portion 511, a first electrically conductive material portion (e.g., the second side surface portion 512), which is a portion of the second side surface portion 512, a first electrically conductive material portion (e.g., a portion of the third side surface portion 513), which is a portion of the third side surface portion 513, a first electrically conductive material portion (e.g., the fourth side surface portion 514), which is a portion of the fourth side surface portion 514, and a first electrically conductive material portion (e.g., the fifth side surface portion 515), which is a portion of the fifth side surface portion 515.

According to an embodiment, at least a portion of the first electrically conductive material portion forming the first side surface portion 511 may be provided as the radiation conductor, at least a portion of the first electrically conductive material portion forming the second side surface portion 512 may be provided as the radiation conductor, at least a portion of the first electrically conductive material portion forming the third side surface portion 513 may be provided as the radiation conductor, at least a portion of the first electrically conductive material portion forming the fourth side surface portion 514 may be provided as the radiation conductor, and at least a portion of the first electrically conductive material portion forming the fifth side surface portion 515 may be provided as the radiation conductor. For example, the fourth slit 516*d* may be formed between the third side surface portion 513 and the fourth side surface portion 514, and the fourth slit 516*d* may separate the third side surface portion 513 and the fourth side surface portion 514 from each other.

According to an embodiment, the third slit 516*c*, the fourth slit 516*d*, and/or the fifth slit 516*e* may be filled with an insulating material. For example, the third slit 516*c*, the fourth slit 516*d*, and/or the fifth slit 516*e* may form a first non-conductive portion, thus insulating the two adjacent electrically conductive portions while mechanically connecting or coupling them.

According to an embodiment, the first conductive portion may be the whole or part of the third side surface portion 513. The third side surface portion 513 may include a first portion 513*a* and a second portion 513*b*. For example, the first portion 513*a* may be formed in a first length L1 along a direction parallel with a first axis (e.g., the folding area A of FIG. 5). The second portion 513*b* may be connected to the first portion 513*a* and be partially formed to be curved. The second portion 513*b* may be formed in a second length L2 along a direction crossing the first axis (e.g., the folding area A of FIG. 5). The first conductive portion may be the whole or part of the fourth side surface portion 514 and may extend perpendicular to the first axis (e.g., the folding area A of FIG. 5). According to an embodiment, the first length L1 may be substantially the same as the third length L3, and the second length L2 may be substantially the same as the fourth length L4.

According to an embodiment, the third slit 516*c* may be formed in a position symmetrical to the eighth slit 526*c*. For example, when viewed from above the first back cover (e.g., the first back cover 240 of FIG. 2) in the folded state of the electronic device, at least a portion of the third slit 516*c* may overlap the eighth slit 526*c*.

According to an embodiment, the radiation feature depending on the position of the third slit 516*c* is described below in greater detail with reference to FIG. 13 or 14. The above values regarding the position of the third slit 516*c* are example values applicable to the electronic device (e.g., the electronic device 200 of FIG. 2) in which the width (e.g., the length along the X-axis direction of FIG. 4) of the first side surface member 501 is 200 mm or less, but it should be noted that embodiments of the disclosure are not limited thereto. For example, the third slit 516*c* may be formed in a different position than that of the example values considering the resonance frequency to be formed using the radiation conductor or the size of the electronic device (e.g., the electronic device 200 of FIG. 2) to be actually manufactured.

According to an embodiment, as described above in connection with FIGS. 6 and 7, the first length L1 of the third side surface portion 513 may be 40 mm along the direction parallel with the first axis (e.g., the folding area A of FIG. 5), and the second length L2 of the third side surface portion 513 may be 18.6 mm along the direction crossing the first axis (e.g., the folding area A of FIG. 5). For example, a length of the third side surface portion 513 formed based on the first length L1 and the second length L2 may correspond to an electrical length of a selected resonance frequency (e.g., a low-band resonance frequency).

Referring to FIGS. 6 and 7, the third side surface portion 513 may be electrically connected with the printed circuit board 530. For example, the third side surface portion 513 may include a ground terminal 513*c*, a power supply terminal 513*d*, and/or a switch terminal 513*e*.

The ground terminal 513*c* may be electrically connected with a ground portion G provided on the printed circuit board 530, and the ground terminal 513*c* may be provided in the third side surface portion 513 to be connected to the wireless communication circuit (e.g., the processor 120 or communication module 190 of FIG. 1) in the position adjacent to the fourth slit 516*d*.

The ground terminal 513*c* may include a ground member, and the ground terminal 513*c* may be electrically connected with the antenna ground. For example, the ground member may include at least one of a leaf spring, a C-clip, a screw, or a flexible printed circuit board 530 (FPCB). The antenna ground may be a conductive layer adjacent to the antenna and may be a conductive layer electrically connected with the ground terminal 513*c*. For example, the antenna ground may include at least one of a PCB ground, a conductive bracket, and a display ground.

The power supply terminal 513*d* as shown in FIG. 7 may be electrically connected to a power supply portion F provided on the printed circuit board 530. For example, the power supply terminal 513*d* may be provided in the third side surface portion 513 to be able to receive power via the power supply portion F of the printed circuit board 530 electrically connected between the ground terminal 513*c* and the switch terminal 513*e*.

According to an embodiment, the electronic device (e.g., the electronic device 200 of FIG. 1) may include a switch portion S disposed in a space formed by the foldable housings (e.g., the pair of housing structures 210 and 220 of FIG. 2). For example, in the plurality of housing structures 210 and 220 and hinge structure (e.g., the hinge structure 264 of FIG. 4) supporting one display (e.g., the display 230 of FIG. 4), the switch portion S may be electrically connected with the switch terminal 513*e* provided in the third side surface portion 513 and may selectively connect the antenna ground with the third side surface portion 513 via one of a plurality of matching paths M1, M2, . . . , Mx. The antenna ground may include the above-described ground portion. Here, "the switch portion selectively connects one of the plurality of matching paths to the third side surface portion 513" may mean that the switch portion S does not connect the third side surface portion 513 with the antenna ground (e.g., the ground portion G) or the switch portion S may connect the third side surface portion 513 with the antenna ground through a matching path M1, M2, . . . , Mx selected under the control of the processor (e.g., the processor 120 of FIG. 1). According to an embodiment, the switch portion S may selectively combine two or more matching paths under the control of the processor, thereby connecting the third side surface portion 513 with the antenna ground. According to an embodiment, by connecting the third side surface portion 513 with the antenna ground via the selected matching path using the switch portion S, the radiation feature of the antenna device 500 may be stabilized or the resonance frequency may be adjusted. According to an embodiment, the antenna ground (e.g., the ground portion G) may include a ground area of the circuit board provided in the electronic device (e.g., the electronic device 200 of FIG. 2), a ground provided in the display (e.g., the display 230 of FIG. 4), or a metal structure electrically connected with the ground. According to an embodiment, the matching paths M1, M2, . . . , Mx may stay connected to a common ground (e.g., the ground portion G).

According to an embodiment, the wireless communication circuit may be electrically connected with the power supply terminal 513d provided in the third side surface portion 513, performing wireless communication using the third side surface portion 513. According to an embodiment, the third side surface portion 513 may form various frequency bands of resonance frequencies depending on its electrical lengths, and the wireless communication circuit may be configured to transmit or receive signals in a frequency band ranging from about 500 MHz to about 6 GHz, using the third side surface portion 513. According to an embodiment, the electronic device 200 may include a plurality of wireless communication circuits, and the wireless communication circuits may transmit or receive different frequency bands of signals using the third side surface portion 513.

According to an embodiment, the power supply terminal 514a provided in the fourth side surface portion 514 may be electrically connected with the power supply portion F of the printed circuit board (e.g., the printed circuit board 530 of FIG. 7), and a portion of the electrically conductive material portion of the fourth side surface portion 514 may be used as an additional radiation conductor forming another resonance frequency. For example, the electronic device 200 may perform wireless communication using a portion of the fourth side surface portion 514. According to an embodiment, the fourth side surface portion 514 may be electrically connected with the ground portion in a different position.

According to an embodiment, the second side surface member 502 may include a sixth side surface portion 521, a seventh side surface portion 522, an eighth side surface portion 523, a ninth side surface portion 524, and/or the tenth side surface portion 525. According to an embodiment, the sixth to tenth side surface portions 521, 522, 523, 524, and 525 may also be referred to as a 'sixth to tenth side surface portion (525) frame.' According to an embodiment, at least a portion of the sixth side surface portion 521 may be disposed in parallel with the folding area A. The seventh side surface portion 522 may be disposed spaced apart from an end (e.g., the top) of the sixth side surface portion 521 in a direction crossing the folding area A or substantially perpendicular to the folding area A. The eighth side surface portion 523 may be disposed spaced apart from the opposite end (e.g., the bottom) of the sixth side surface portion 521 in parallel with the folding area A.

The ninth side surface portion 524 may be disposed adjacent to an end of the eighth side surface portion 523 and may be disposed spaced apart from the eighth side surface portion 523 and may extend to the folding area A in a direction crossing, or in a direction substantially perpendicular. The tenth side surface portion 525 may extend substantially in parallel with the folding area A. One end of the tenth side surface portion 525 is disposed spaced apart from the an end of the seventh side surface portion 522, and the other end of the tenth side surface portion 525 is disposed spaced apart from an end of the ninth side surface portion 524. According to an embodiment, the tenth side surface portion 525 may be disposed adjacent to the hinge structure or hinge cover (e.g., the hinge structure 264 or hinge cover 265 of FIG. 4) and may extend along the folding area A substantially in parallel with the hinge structure or hinge cover.

According to an embodiment, the second side surface member 502 may include other slit(s) 526a, 526b, 526c, 526d, and 526e at least partially separating the electrically conductive material portions. A structure formed of an insulating material may be formed in at least part of the area surrounded by the fifth to tenth side surface portions 521, 522, 523, 524, and 525. According to an embodiment, the slit(s) 526a, 526b, 526c, 526d, and 526e may be filled with an insulating material. For example, the second side surface member 502 may include an insulating material portion that insulates some electrically conductive material portion from the other electrically conductive material portions.

According to an embodiment, the sixth slit 526a may be formed between one end of the sixth side surface portion 521 and the seventh side surface portion 522, and the seventh slit 526b may be formed between the seventh side surface portion 522 and the tenth side surface portion 525. The eighth slit 526c may be formed between the opposite end of the sixth side surface portion 521 and the eighth side surface portion 523. The ninth slit 526d may be formed between the eighth side surface portion 523 and the ninth side surface portion 524, and the tenth slit 526e may be formed between the ninth side surface portion 524 and the tenth side surface portion 525.

At least part of the seventh side surface portion 522, the eighth side surface portion 523, and the ninth side surface portion 524 may be formed of an electrically conductive material. At least part of the seventh side surface portion 522, the eighth side surface portion 523, and/or the ninth side surface portion 524 may be formed as a radiation conductor. According to an embodiment, the seventh side surface portion 522, the eighth side surface portion 523, and/or the ninth side surface portion 524 may function as an antenna radiator (e.g., a radiation conductor) of the electronic device (e.g., the electronic device 200 of FIG. 2). For example, the processor (e.g., the processor 120 of FIG. 1) or communication module (e.g., the communication module 190) of the electronic device 200 may perform wireless communication using a portion of the seventh side surface portion 522, the eighth side surface portion 523, and the ninth side surface portion 524.

For example, when viewed from above the first back cover (e.g., the first back cover 240 of FIG. 2) in the folded state of the electronic device (e.g., the electronic device 200 of FIG. 2), at least a portion of the eighth slit 526c may overlap the third slit 516c.

According to an embodiment, the third length L3 may be substantially the same as the first length L1, and the fourth length L4 may be substantially the same as the second length L2. The third length L3 and the fourth length L4 may be identical or similar in value to the first length L1 and the second length L2 of FIG. 5, and no duplicate description thereof is given below.

Figure 8:
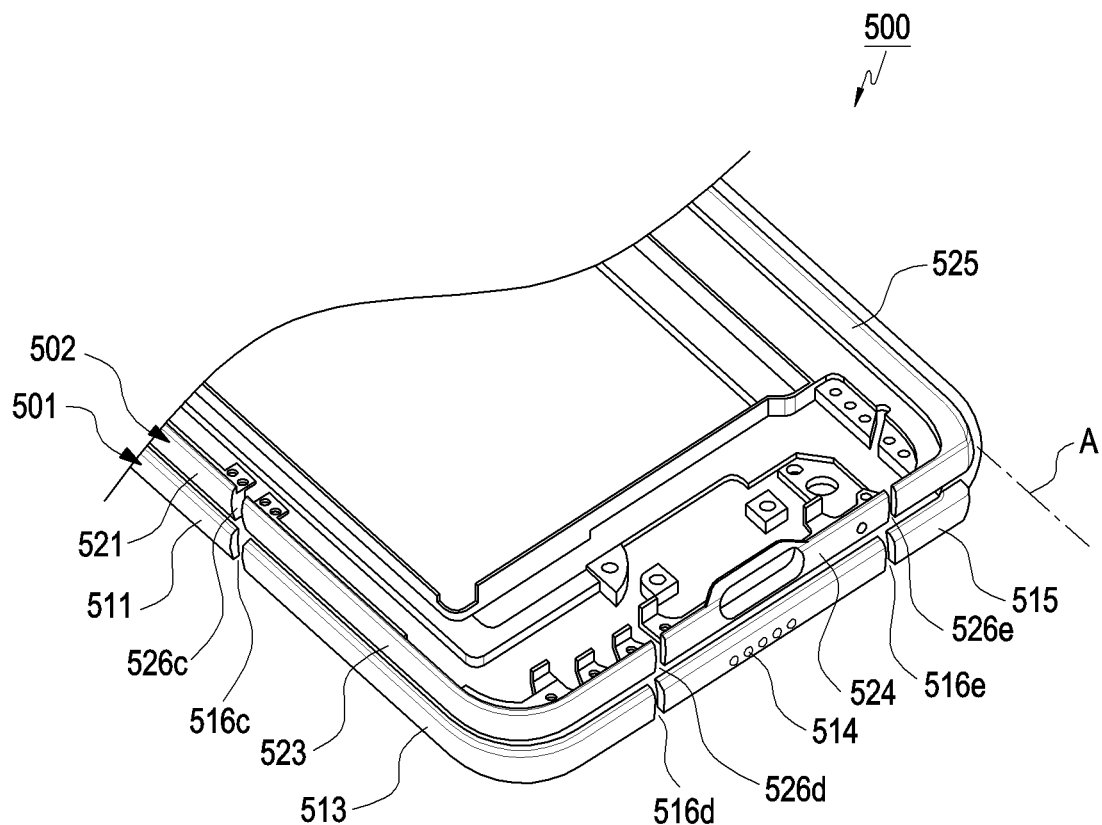
FIG. 8 is a perspective view illustrating an electronic device in a folded state according to an embodiment of the disclosure.

FIG. 8 is a perspective view illustrating an electronic device (e.g., the electronic device 200 of FIG. 2) in a folded state according to an embodiment of the disclosure.

Figure 9:
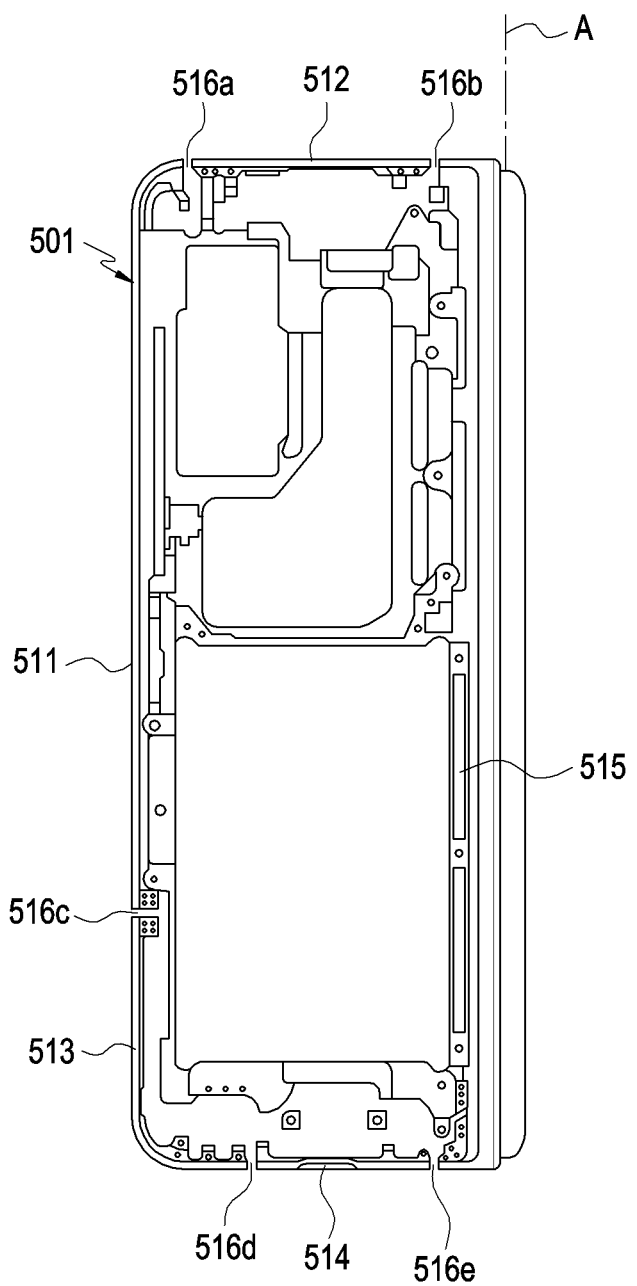
FIG. 9 is a plan view illustrating an electronic device in a folded state according to an embodiment of the disclosure.

FIG. 9 is a plan view illustrating an electronic device (e.g., the electronic device 200 of FIG. 2) in a folded state according to an embodiment of the disclosure.

Figure 10:
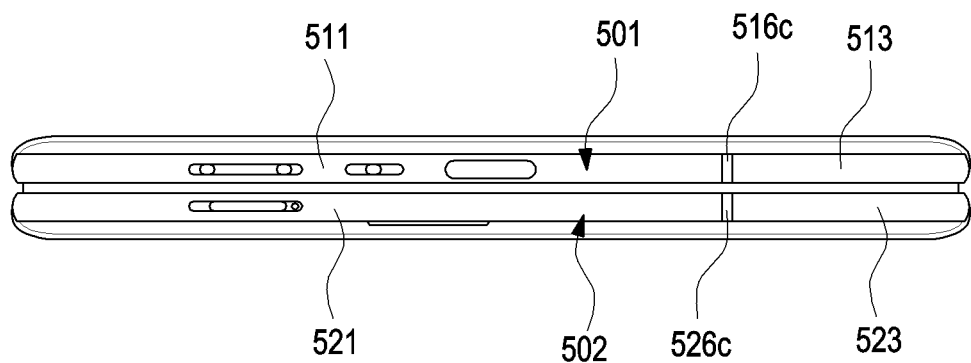
FIG. 10 is a side view illustrating a third slit and an eighth slit among components of an electronic device in a folded state according to an embodiment of the disclosure.

FIG. 10 is a side view illustrating a third slit 516c and an eighth slit 526c among components of an electronic device (e.g., the electronic device 200 of FIG. 2) in a folded state according to an embodiment of the disclosure.

Figure 11:
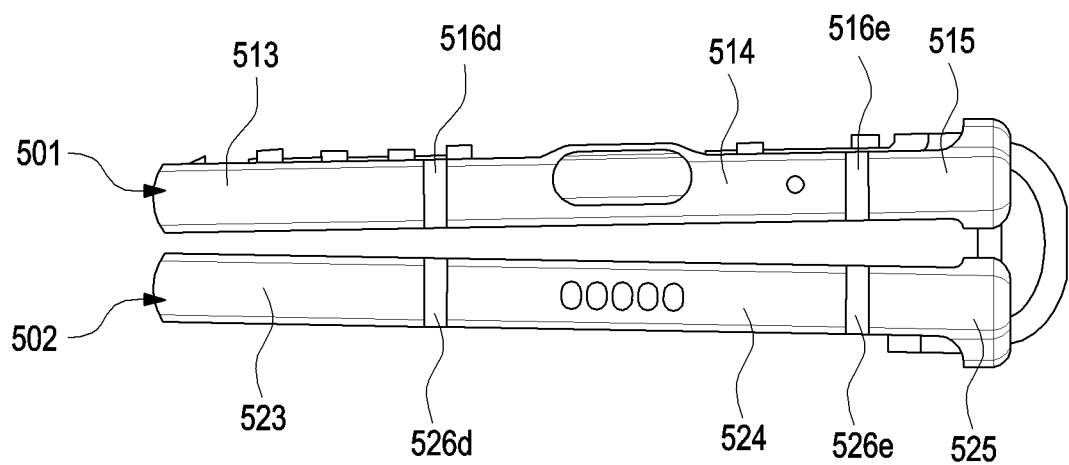
FIG. 11 is a bottom view illustrating a fourth, fifth, ninth, and tenth slit among components of an electronic device in a folded state according to an embodiment of the disclosure.

FIG. 11 is s bottom view illustrating a fourth, fifth, ninth, and tenth slit 516d, 516e, 526d, and 526e among components of an electronic device (e.g., the electronic device 200 of FIG. 2) in a folded state according to an embodiment of the disclosure.

Referring to FIGS. 8 through 11, an electronic device (e.g., the electronic device 200 of FIG. 2) may include a first housing structure (e.g., the first housing structure 210 of FIG. 2), a second housing structure, (e.g., the second housing structure 220 of FIG. 2), and a hinge structure (e.g., the hinge structure 264 of FIG. 4). As the first housing structure (e.g., the first housing structure 210 of FIG. 2) and the second housing structure (e.g., the second housing structure 220 of FIG. 2) each rotate on the hinge structure (e.g., the hinge structure 264 of FIG. 4), they may be folded so that the first surface 211 of the first housing structure 210 faces the third surface 221 of the second housing structure 220.

According to an embodiment, as the first and second side surface members 501 and 502 are viewed from the outside, as shown in FIG. 10, in the position where the first housing structure is folded to face the second housing structure, the third slit 516c and the eighth slit 526c may be aligned to be adjacent to each other. According to an embodiment, the third slit 516c may be formed in the first side surface member 501, and the eighth slit 526c may be formed in the second side surface member 502. In this state, when the first side surface member 501 or the second side surface member 502 is viewed from the outside in the position where the first housing structure is folded to face the second housing structure, the third slit 516c formed in the first side surface member 501 and the eighth slit 526c formed in the second side surface member 502 may be aligned to be adjacent to each other.

According to an embodiment, when the bottom of the first and second side surface members 501 and 502 is viewed from the outside in the folded state of the electronic device (e.g., the electronic device 200 of FIG. 2), the fourth slit 516d and the fifth slit 516e formed in the first side surface member 501 and the ninth slit 526d and the tenth slit 526e formed in the second side surface member 502 may be aligned to be adjacent to each other. For example, in the folded state of the electronic device (e.g., the electronic device 200 of FIG. 2), the non-conductive portions formed in the fourth slit 516d and fifth slit 516e and the ninth slit 526d and tenth slit 526e may also be aligned to be adjacent to each other.

Referring to FIGS. 2 and 5, as the first housing structure (e.g., the first housing structure 210 of FIG. 2) and the second housing structure (e.g., the second housing structure 220 of FIG. 2) each rotate on the hinge structure (e.g., the hinge structure 264 of FIG. 4), they may be folded so that the first surface 211 of the first housing structure 210 and the third surface 221 of the second housing structure 220 may be arranged side-by-side. For example, in the state where the first surface 211 faces the third surface 221, the first housing structure 210 and the second housing structure 220 may be rotated on the hinge structure (e.g., the hinge structure 264 of FIG. 4), unfolding and positioning themselves side-by-side. In this case, the first, second, third, fourth, and fifth slits 516a, 516b, 516c, 516d, and 516e of the first side surface member 501 of the first housing structure 210 and the sixth, seventh, eighth, ninth, and tenth slits 526a, 526b, 526c, 526d, and 526e of the second supporting member 262 of the second housing structure 220 may be arranged symmetrical with each other with respect to the hinge structure (e.g., the hinge structure 264 of FIG. 4).

Figure 12:
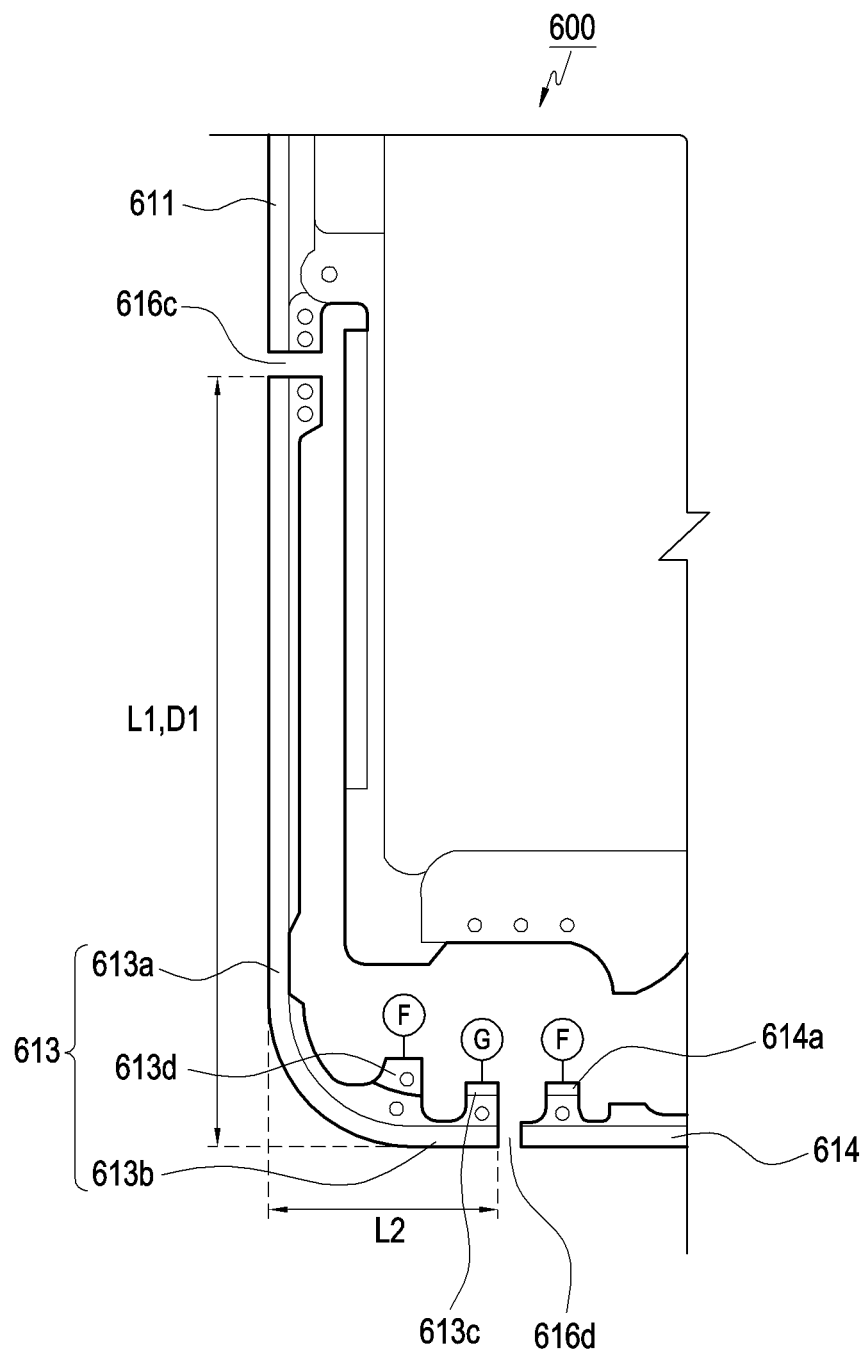
FIG. 12 is a view illustrating a configuration of an antenna device in an electronic device according to an embodiment of the disclosure.

FIG. 12 is a view illustrating a configuration of an antenna device 600 in an electronic device (e.g., the electronic device 200 of FIG. 1) according to an embodiment of the disclosure.

Referring to FIG. 12, the first conductive portion of the antenna device 600 may be the whole or part of the third side surface portion 613 of the first side surface member. The third side surface portion 613 may include a first portion 613a and a second portion 613b. For example, the first portion 613a may be formed in a first length L1 along a direction parallel with a first axis (e.g., the folding area A of FIG. 5). The second portion 613b may be connected to the first portion 613a and be formed to be curved. The second portion 513b may be formed in a second length L2 along a direction crossing the first axis (e.g., the folding area A of FIG. 5). The first conductive portion may be the whole or part of the fourth side surface portion 614 and may extend perpendicular to the first axis (e.g., the folding area A of FIG. 5).

According to an embodiment, the third slit 616c may be formed between the first side surface portion 611 and the third side surface portion 613 in a position a predetermined distance away from the first portion 613a of the third side surface portion 613 in a direction parallel with the first axis (e.g., the folding area A of FIG. 5). According to an embodiment, as the third slit 616c is formed in the position of a first length L1 which is a distance D1 not less than 30 mm and not more than 50 mm (e.g., 46 mm) from the first portion 613a of the third side surface portion, a radiation conductor (e.g., the third side surface portion 613) with a radiation performance required in the plurality of housing structures 210 and 220 and hinge structure (e.g., the hinge structure 264 of FIG. 4) supporting one display (e.g., the display 230 of FIG. 4) may be provided, the radiation performance deterioration of the radiation conductor (e.g., the third side surface portion 613) may be reduced, and the radiation performance deterioration of the radiation conductor (e.g., the third side surface portion 613) due to influence by the user's body in the user's hand grip on the electronic device (e.g., the electronic device 101 of FIG. 1) may be reduced. As such, the third slit 616c may enhance the radiation performance of the radiation conductor (e.g., the third side surface portion). For example, when a human body approaches an end of the radiation conductor (e.g., the third side surface portion 613), a drastic variation in the resonance frequency may occur, resulting in radiation performance deterioration. Thus, repositioning the third slit 616c by the first length L1 may enhance the radiation performance of the radiation conductor (e.g., the third side surface portion).

According to an embodiment, as described above in connection with FIG. 12, the first length L1 of the third side surface portion 613 may be a length (e.g., 46 mm) between 0 mm and 50 mm along the direction parallel with the first axis (e.g., the folding area A of FIG. 5), and the second length L2 of the third side surface portion 613 may be a length (e.g., 12.6 mm) between 2.6 mm and 22.6 mm along the direction crossing the first axis (e.g., the folding area A of FIG. 5).

For example, the sum of the first length L1 and the second length L2 may correspond to an electrical length of a low-band resonance frequency, and allowing the first length L1 to be larger than the second length L2 may turn the flow of ground current shown in FIG. 13, described below, from the horizontal direction to the vertical direction. This may minimize the radiation performance deterioration of the radiation conductor (e.g., the third side surface portion 513)

and hence enhance the radiation performance of the radiation conductor (e.g., the third side surface portion 513).

Referring to FIG. 12, the third side surface portion 613 may be electrically connected with the printed circuit board (e.g., the printed circuit board 530 of FIG. 7). For example, the third side surface portion 613 may include a ground terminal 613c and a power supply terminal 613d.

The ground terminal 613c may be electrically connected with a ground portion G provided on the printed circuit board, and the ground terminal 613c may be provided in the third side surface portion 613 to be connected to the wireless communication circuit (e.g., the processor 120 or communication module 190 of FIG. 1) in a position between the fourth slit 616d and the power supply terminal 613d.

The ground terminal 613c may include a ground member, and the ground terminal 613c may be electrically connected with the antenna ground.

The power supply terminal 613d may be electrically connected with the power supply portion F provided on the printed circuit board (e.g., the printed circuit board 530 of FIG. 7). For example, the power supply terminal 613d may be provided in the third side surface portion 613 to be able to receive power via the power supply portion F of the printed circuit board (e.g., the printed circuit board 530 of FIG. 7) electrically connected in the position adjacent to the ground terminal 613c.

According to an embodiment, a power supply terminal 614a provided in the fourth side surface portion 614, independently from the third side surface portion 613, may be electrically connected with the power supply portion F of the printed circuit board (e.g., the printed circuit board 530 of FIG. 7), and a portion of the electrically conductive material portion of the fourth side surface portion 614 may be used as an additional radiation conductor forming another resonance frequency. For example, the power supply terminal 614a may be provided in the fourth side surface portion 614 to be able to receive power via the power supply portion F of the printed circuit board (e.g., the printed circuit board 530 of FIG. 7) electrically connected in the position adjacent to the fourth slit 616d.

Figure 13:
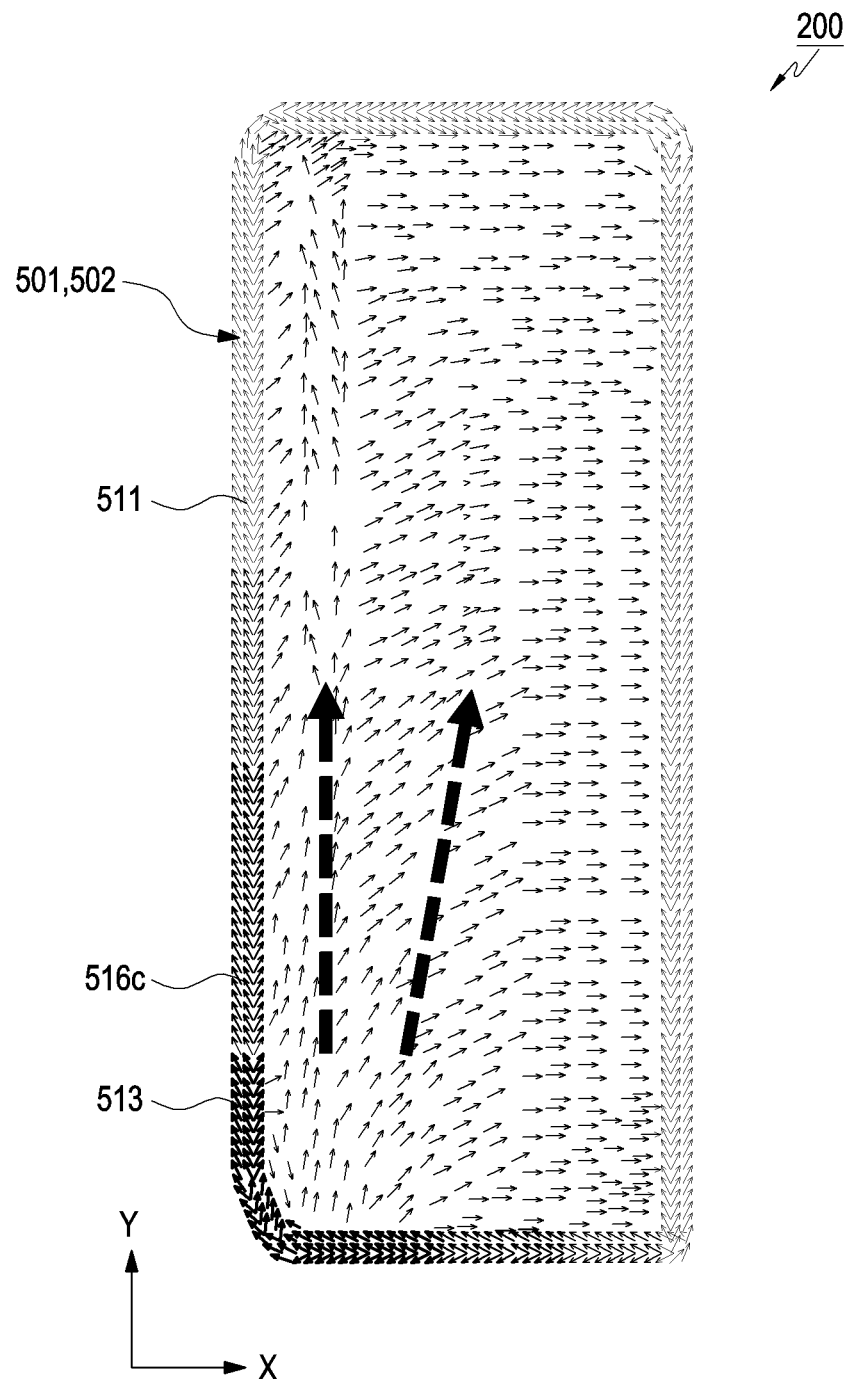
FIG. 13 is a view illustrating an electromagnetic field distribution of an electronic device in a folded state according to an embodiment of the disclosure.
Figure 14:
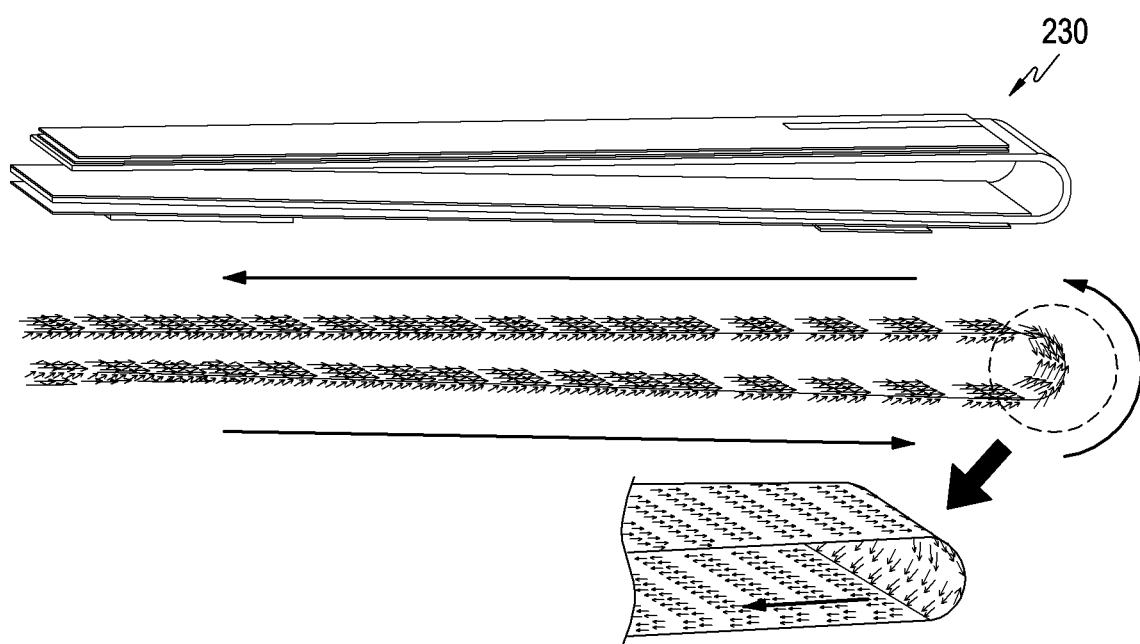
FIG. 14 is a view illustrating an electromagnetic field distribution of a display ground of an electronic device in a folded state according to an embodiment of the disclosure.
Figure 15:
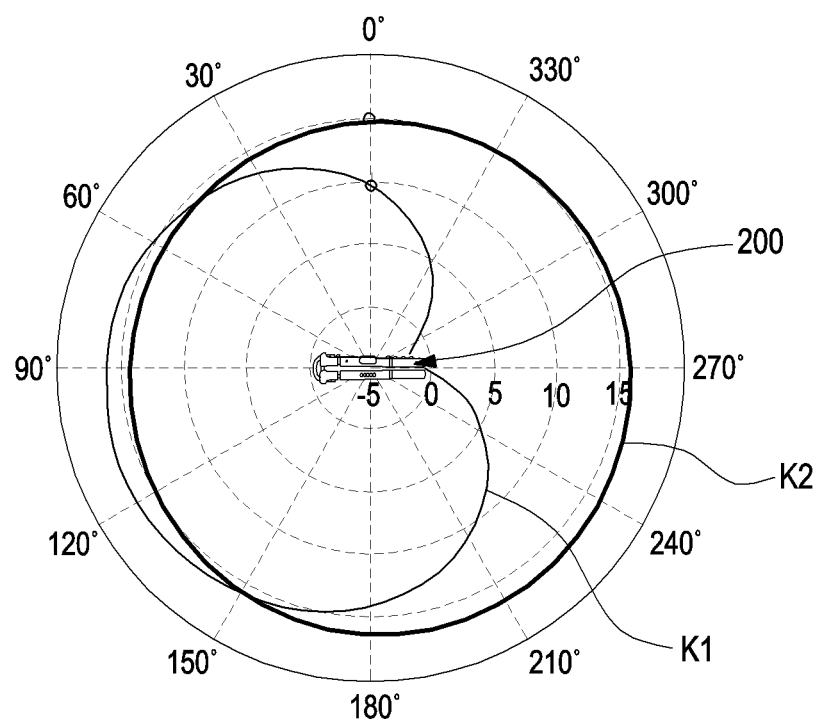
FIG. 15 is a graph illustrating a radiation pattern measured on an electronic device according to an embodiment of the disclosure.

For example, variations in radiation feature and current flow depending on the position of the slits (e.g., the third slit 516c and the eighth slit 526c of FIG. 5) when the electrically conductive material portions of the first and second housing structures (e.g., the first and second housing structures 210 and 220 of FIG. 2) are used as a radiation conductor in the plurality of housings (e.g., the first and second housing structures 210 and 220 of FIG. 2) and hinge structure (e.g., the hinge structure 264 of FIG. 4) supporting one display (e.g., the display 230 of FIG. 4) in the foldable electronic device (e.g., the electronic device 200 of FIG. 2) are described below with reference to FIGS. 13 to 15.

FIG. 13 is a view illustrating a current flow formed in the first and second side surface members 501 and 502 of the first and second housing structures (e.g., the first and second housing structures 210 and 220 of FIG. 2) in the electronic device (e.g., the electronic device 200 of FIG. 2) according to an embodiment of the disclosure.

FIG. 13 illustrates the current flow in the case where a radiation conductor is implemented by placing the third slit 516c between the first side surface portion 511 and the third side surface portion 513 and the eighth slit (e.g., the eighth slit 526c of FIG. 5) between the sixth second surface portion (e.g., the sixth side surface portion 521 of FIG. 5) and the eighth side surface portion (e.g., the eighth side surface portion 523 of FIG. 5), the power supply portion and the ground portion are connected in the same manner as shown in FIG. 6. It may be identified that upon performing wireless communication using the third side surface portion 513 and the eighth side surface portion 523 as the radiation conductor, the current flow in the electronic device 200 may turn from the shorter-axis direction (e.g., the X-axis direction) of the electronic device to the longer-axis direction (e.g., the Y-axis direction) of the electronic device.

It may thus be identified that as the current flow turns into the longer-axis direction (e.g., the Y-axis direction) in the structure of FIGS. 6 and 9, the electronic device 200 may be given a better antenna performance.

FIG. 14 is a view illustrating the flow of radiation current through the ground of the display (e.g., the display 230 of FIG. 4) as the conductive layer (e.g., a shielding sheet or display ground layer) of the display (e.g., the display 230 of FIG. 4) operates as the antenna ground when the electronic device is in the folded state, according to an embodiment of the disclosure.

Referring to FIGS. 13 and 14, in the folded state of the electronic device (e.g., the electronic device 200 of FIG. 2), the conductive layer of the display (e.g., the display 230 of FIG. 4) is included as the antenna ground and a specific frequency band (e.g., 1 GHz) of radiation current flows through the conductive layer of the display (e.g., the display 230 of FIG. 4). The ground of the display (e.g., the display 230 of FIG. 4) may have the largest electrical length among the antenna grounds and may thus have a largest influence on radiation. For example, in the case where the ground of the display (e.g., the display 230 of FIG. 4) is formed long along the X axis, if the electronic device (e.g., the electronic device 200 of FIG. 2) is folded, the X axis may be formed as the dominant radiation current direction of antenna. In the folded electronic device (e.g., the electronic device 200 of FIG. 2), the radiation current flows in the first and second side surface members 501 and 502 may be disturbed due to their mutual interference, resulting in performance deterioration. This may be addressed by forming the third slit 516c and the eighth slit 526c and the third side surface portion 513 and eighth side surface portion 523 (e.g., a radiation conductor) in the first and second side surface members 501 and 502. For example, allowing the first and third lengths L1 and L3 of the third and eighth side surface portions 513 and 523 to be larger than the second and fourth lengths L2 and L4 of the third and eighth side surface portions 513 and 523 enables the current induced in the adjacent ground to be induced along the Y axis, rather than the X axis, thereby minimizing interference.

FIG. 15 is a graph illustrating a radiation pattern of an electronic device 200 in a low band (e.g., an 800 MHz band) in the folded state according to an embodiment of the disclosure.

Referring to FIG. 15, 'K1' denotes the radiation pattern of antenna obtained by supplying power to a radiation conductor (e.g., the fourth side surface portion 514 of FIG. 5) provided at the bottom of the electronic device, in the low band (e.g., an 800 MHz band), when the electronic device has no side slit (e.g., the third slit 516c and the eighth slit 526c of FIG. 5) but has bottom slits (e.g., the fourth slit 516d, fifth slit 516e, ninth slit 526d, and tenth slit 526e of FIG. 5), and 'K2' denotes the radiation pattern of antenna obtained by supplying power to the third and eighth side surface portions (e.g., the third and eighth side surface portions 513 and 523 of FIG. 5) used as a radiation conductor, in the low band (e.g., an 800 MHz band), when the electronic device has side slits (e.g., the third slit 516c and eighth slit 526c of FIG. 5) and the third and eighth side surface portions (e.g., the third side surface portion 513 and eighth side surface portion 523 of FIG. 5).

For example, in the plurality of housing structures 210 and 220 and hinge structure (e.g., the hinge structure 264 of FIG. 4) supporting one display (e.g., the display 230 of FIG. 4), using the radiation conductor of the third and eighth side surface portions (e.g., the third side surface portion 513 and eighth side surface portion 523 of FIG. 5) as an antenna after forming the side slits may yield a radiation pattern of more directions as compared with the radiation conductor (e.g., the fourth side surface portion 514 of FIG. 5) provided at the bottom of the electronic device.

As described above in connection with FIGS. 10 and 11, when the side of the first side surface member 501 and the second side surface member 502 is viewed from the outside in the folded state of the electronic device (e.g., the electronic device 200 of FIG. 2), the third slit 516c and the eighth slit 526c may be aligned to be adjacent to each other, and when the bottom of the first and second side surface members 501 and 502 is viewed from the outside in the folded state of the electronic device (e.g., the electronic device 200 of FIG. 2), the fourth slit 516d, the fifth slit 516e, the ninth slit 526d, and the tenth slit 526e may be aligned to be adjacent to each other.

As shown in FIG. 15, it may be identified that 'K2' yields a more stable radiation pattern than 'K1.' For example, while the radiation pattern of 'K2' is a stable radiation pattern, close to a circle, the radiation pattern of 'K1' is an irregular radiation pattern far from a circle. Thus, formation of the third slit (e.g., the third slit 516c of FIG. 5) and the eighth slit (e.g., the eighth slit 526c of FIG. 5) in the side of the first and second side surface members 501 and 502 allows for stable antenna performance in the plurality of housing structures 210 and 220 and hinge structure (e.g., the hinge structure 264 of FIG. 4) supporting one display (e.g., the display 230 of FIG. 4), when the electronic device is in the folded state, thus enhancing the antenna performance and hence reducing the radiation performance deterioration of the radiation conductor due to influence by the user's body when the user makes a call with the electronic device 200 in his hand.

Figure 16A:
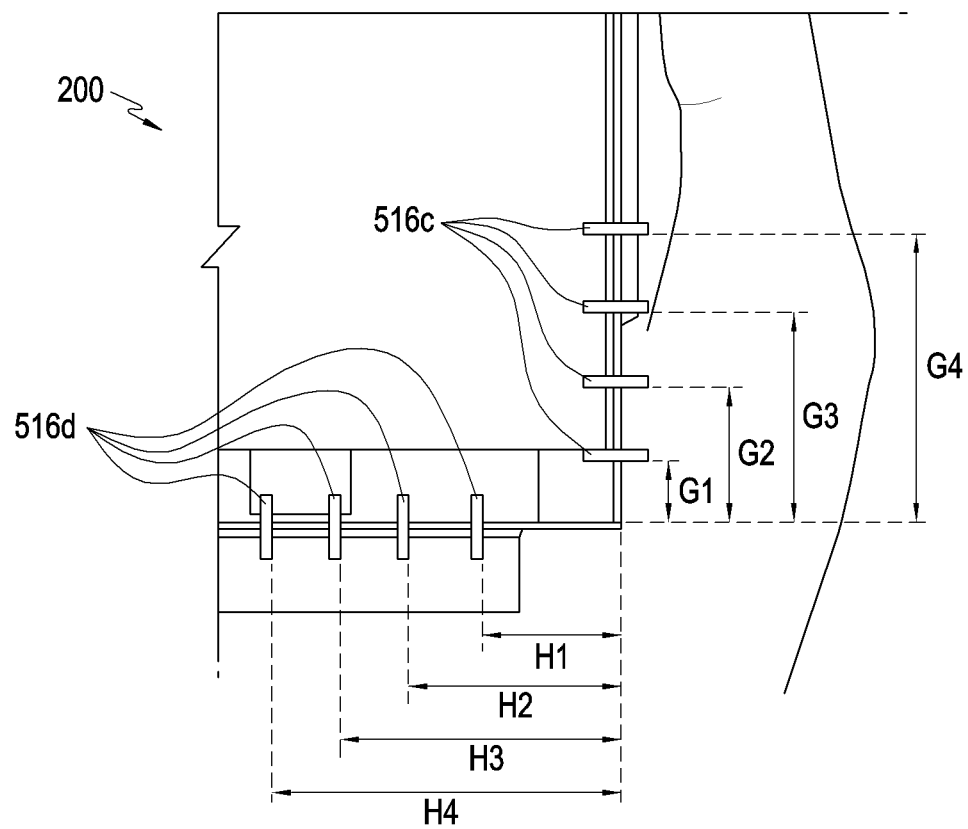
FIG. 16A is a view illustrating a first, second, third, and fourth distance of slots formed in a side surface or bottom of an electronic device, with the folded electronic device in the user's hand (e.g., the right hand) according to an embodiment of the disclosure.

FIG. 16A is a view illustrating a first, second, third, and fourth distance G1, G2, G3, and G4 of slots (e.g., the third slit 516c of FIG. 5) formed in a first side surface (e.g., the first side surface 213a of FIG. 2) of an electronic device 200, or a first, second, third, and fourth distance H1, H2, H3, and H4 of slots (e.g., the fourth slit 516d of FIG. 5) formed in the third side surface (e.g., the third side surface 213c) of the electronic device 200, with the folded electronic device 200 in the user's hand (e.g., the right hand) according to an embodiment of the disclosure.

Figure 16B:
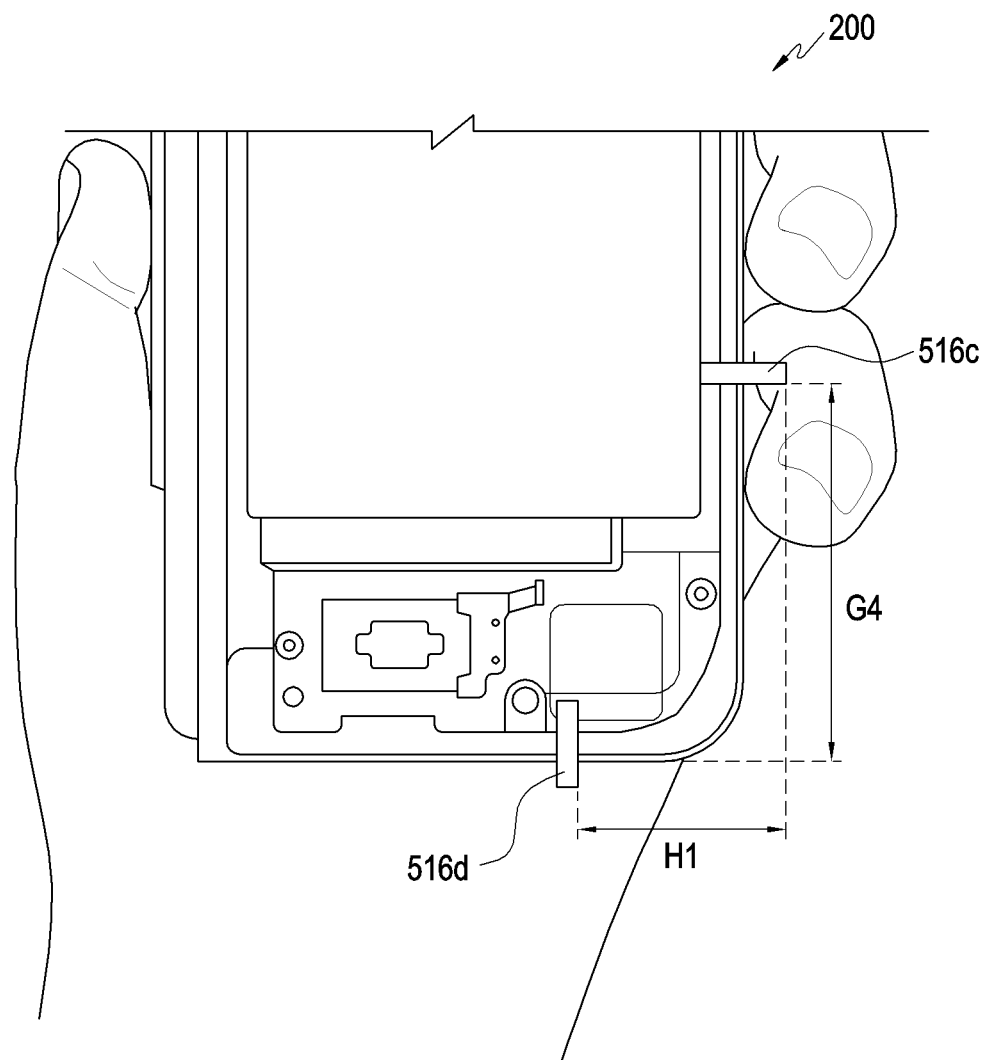
FIG. 16B is a view illustrating a fourth distance of a slot formed in a side surface of an electronic device or a first distance of a slot formed in a bottom of the electronic device, with the folded electronic device in the user's hand (e.g., the left hand) according to an embodiment of the disclosure.

FIG. 16B is a view illustrating a fourth distance G4 of a slot (e.g., the third slit 516c of FIG. 5) formed in the first side surface (e.g., the first side surface 213a of FIG. 2) of the electronic device 200 or a first distance H1 of a slot (e.g., the fourth slit 516d of FIG. 5) formed in a third side surface (e.g., the third side surface 213c) of the electronic device, with the folded electronic device 200 in the user's hand (e.g., the left hand) according to an embodiment of the disclosure.

Figure 17:
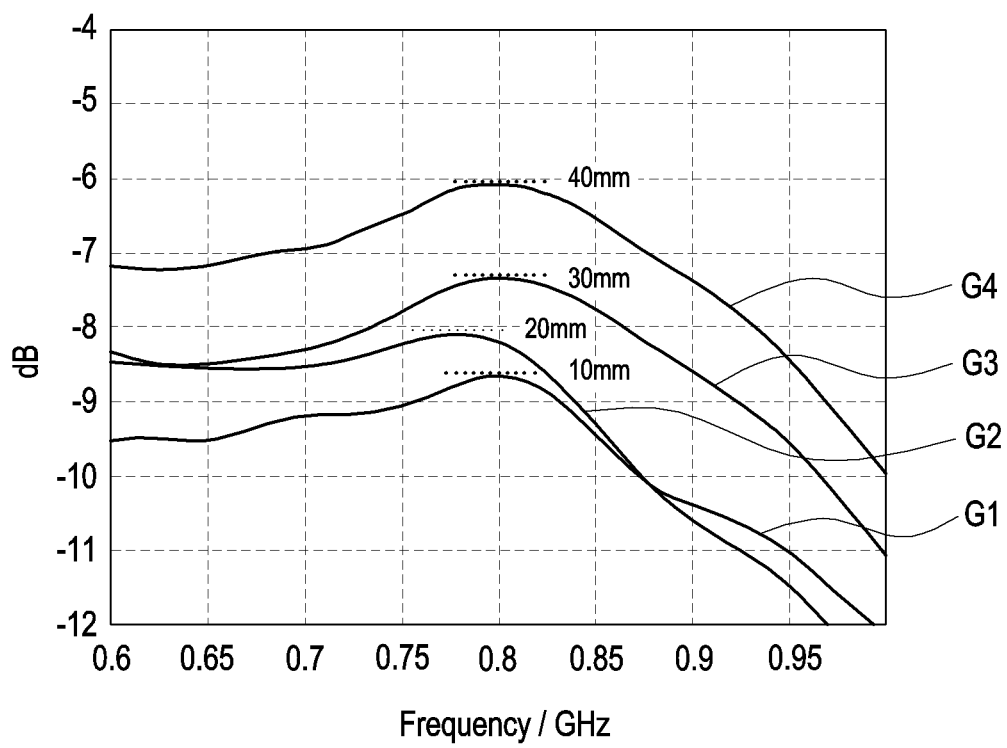
FIG. 17 is a graph illustrating a radiation efficiency measured on an electronic device according to an embodiment of the disclosure.

FIG. 17 is a graph illustrating variations in radiation feature depending on the first, second, third, and fourth distances G1, G2, G3, and G4 of the slits (e.g., the third slit 516c of FIG. 5) formed in the first side surface member (e.g., the first side surface member 501 of FIG. 2) in the electronic device according to an embodiment of the disclosure.

Referring to FIG. 16A, the slit 516c formed in the first side surface of the electronic device 200 may be formed in the positions of the first, second, third, and fourth distances G1, G2, G3, and G4. For example, the first distance G1, the second distance G2, the third distance G3, and the fourth distance G4 may be 10 mm, 20 mm, 30 mm, and 40 mm, respectively. The slits 516d formed in the third side surface of the electronic device may be formed in the positions of the first, second, third, and fourth distances H1, H2, H3, and H4. For example, the first distance H1, the second distance H2, the third distance H3, and the fourth distance H4 may be 18.5 mm, 28.5 mm, 38.5 mm, and 48.5 mm, respectively.

Referring to FIG. 16B, the fourth distance G4 of the slit 516c formed in the first side surface of the electronic device 200 may be 40 mm. The first distance H1 of the slit 516d formed in the third side surface of the electronic device 200 may be 18.5 mm.

Referring to FIG. 17, it may be identified that a better radiation efficiency may be secured in the fourth distance G4 of the slit 516c formed in the first side surface of the electronic device 200 than in the first, second, and third distances G1, G2, and G3.

Figure 18:
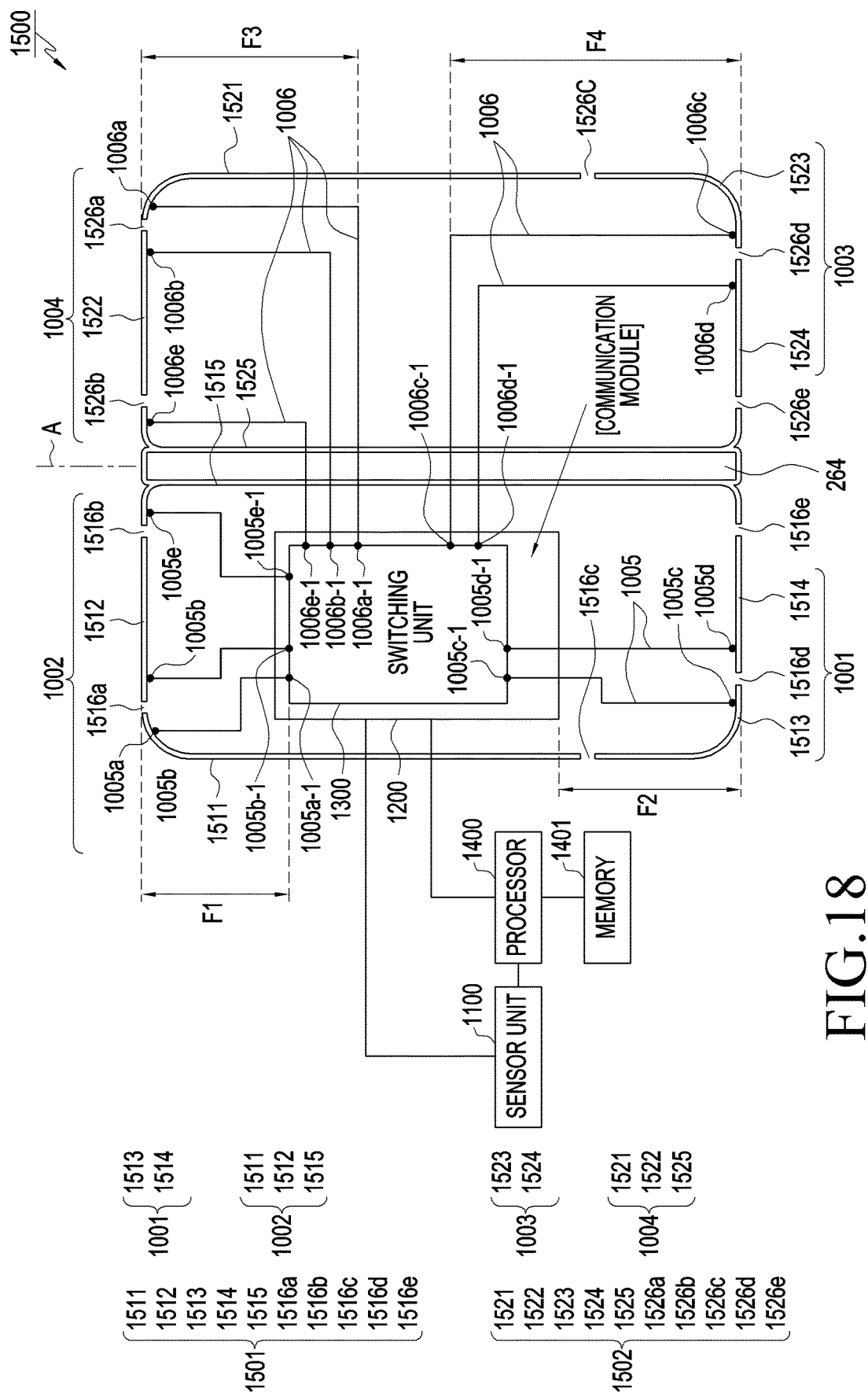
FIG. 18 is a view illustrating a configuration of a first and second side surface member electrically connected with a switching unit in a first housing structure of an electronic device using a coaxial cable according to an embodiment of the disclosure.

FIG. 18 is a view illustrating a configuration of a first and second side surface member 1501 and 1502 electrically connected with a switching unit 1300 in a first housing structure (e.g., the first housing structure 210 of FIG. 2) of an electronic device (e.g., the electronic device 200 of FIG. 2) using a coaxial cable according to an embodiment of the disclosure.

Figure 19:
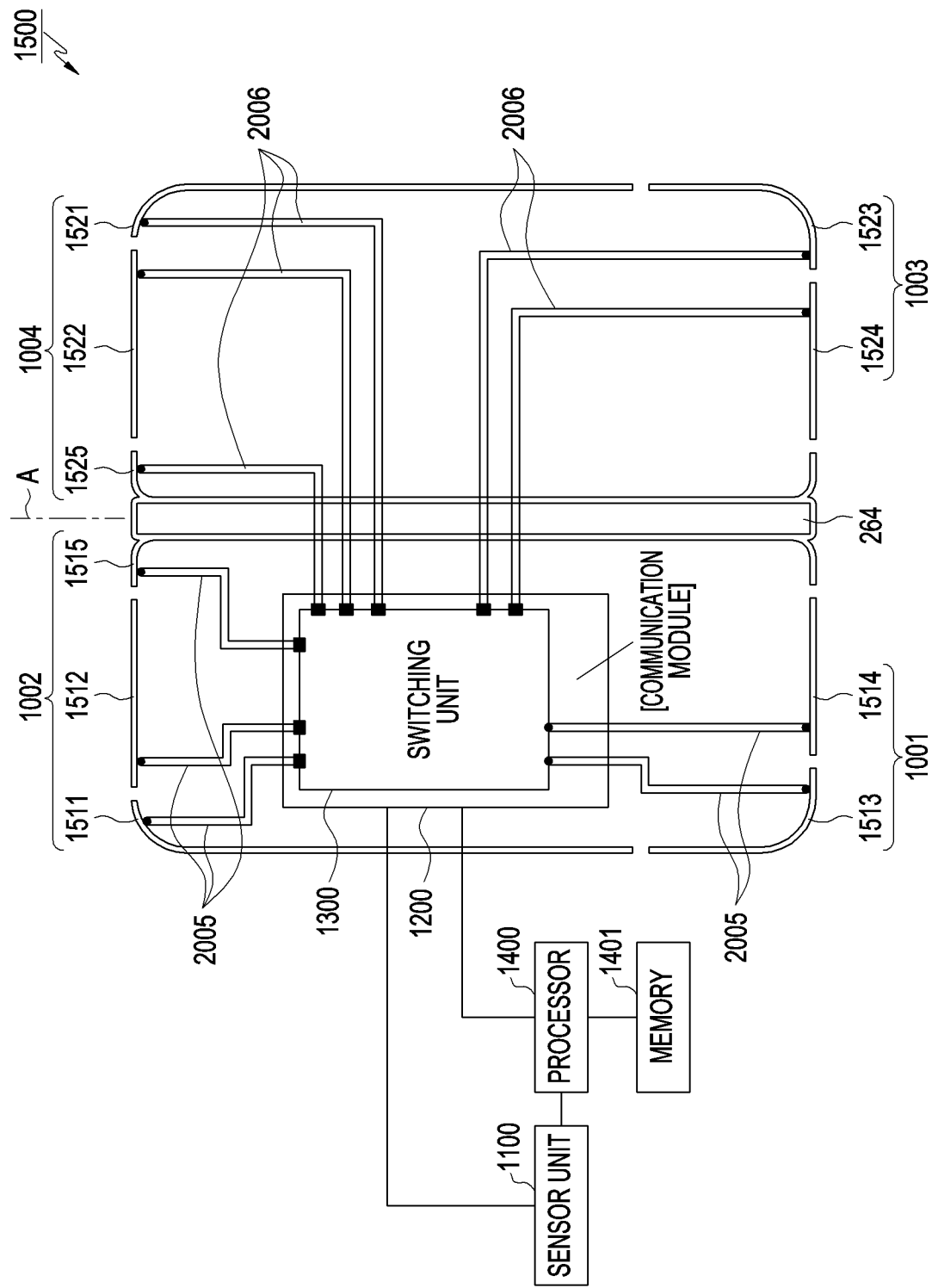
FIG. 19 is a view illustrating a configuration of a first and second side surface member electrically connected with a switching unit in a first housing structure of an electronic device using a flexible printed circuit board according to an embodiment of the disclosure.

FIG. 19 is a view illustrating a configuration of a first and second side surface member 1501 and 1502 electrically connected with a switching unit 1300 in a first housing structure 210 of an electronic device 200 using a flexible printed circuit board (FPCB) according to an embodiment of the disclosure.

Referring to FIGS. 18 and 19, the first side surface member 1501 may be provided as part of the first housing structure 210 of FIG. 2, and the second side surface member 1502 may be provided as part of the second housing structure 220 of FIG. 2. According to an embodiment, the first side surface member 1501 may include a first side surface portion 1511, a second side surface portion 1512, a third side surface portion 1513, a fourth side surface portion 1514, and/or a fifth side surface portion 1515. According to an embodiment, the first to fifth side surface portions 1511, 1512, 1513, 1514, and 1515 may also be referred to as a 'first to fifth side surface portion partial frame.' According to an embodiment, the first side surface portion 1511 may be disposed in parallel with the folding axis A. The second side surface portion 1512 may be disposed spaced apart from an end (e.g., the top) of the first side surface portion 1511 in a direction crossing the folding area A or substantially perpendicular to the folding area A. The third side surface portion 1513 may be disposed spaced apart from the opposite end (e.g., the bottom) of the first side surface portion 1511 in parallel with the folding area (e.g., the folding area A of FIG. 2). The fourth side surface portion 1514 may be disposed adjacent to an end of the third side surface portion 1513 and may be disposed spaced apart from the third side surface portion 1513 and may extend to the folding area A in a direction crossing, or in a direction substantially perpendicular. The fifth side surface portion 1515 may extend substantially in parallel with the folding area A or the first side surface portion 1511. One end of the fifth side surface portion 1515 is disposed spaced apart from an end of the second side surface portion 1512, and the other end of the fifth side surface portion 1515 is disposed spaced apart from an end of the fourth side surface portion 1514. According to an embodiment, the fifth side surface portion 515 may be disposed adjacent to the hinge structure or hinge cover (e.g., the hinge structure 264 or hinge cover 265 of FIG. 4) and may extend along the folding area A substantially in parallel with the hinge structure 264 or hinge cover 265.

According to an embodiment, the first side surface member 1501 may include a first to fifth slit 1516*a*, 1516*b*, 1516*c*, 1516*d*, and 1516*e* at least partially separating the electrically conductive material portions. The first to fifth slits 1516*a*, 1516*b*, 1516*c*, 1516*d*, and 1516*e* may be filled with an insulating material. The first slit 1516*a* may be formed between one end of the first side surface portion 1511 and the second side surface portion 1512, and the second slit 1516*b* may be formed between the second side surface portion 1512 and the fifth side surface portion 1515. The third slit 516*c* may be formed between the opposite end of the first side surface portion 1511 and the third side surface portion 1513. The fourth slit 1516*d* may be formed between the third side surface portion 1513 and the fourth side surface portion 1514, and the fifth slit 1516*e* may be formed between the fourth side surface portion 1514 and the fifth side surface portion 1515.

According to an embodiment, a first to fifth connection terminal 1005*a*, 1005*b*, 1005*c*, 1005*d*, and 1005*e* may be formed at the respective first ends of the plurality of first connection members 1005 to be electrically connected with ground terminals (not shown) formed in the first to fifth side surface portions 1511, 1512, 1513, 1514, and 1515, and a first to fifth switch connection terminal 1005*a*-1, 1005*b*-1, 1005*c*-1, 1005*d*-1, and 1005*e*-1 may be formed at the respective second ends of the plurality of first connection members 1005 to be electrically connected with switch terminals formed in the switching unit 1300.

According to an embodiment, the second side surface member 1502 may include a sixth side surface portion 1521, a seventh side surface portion 1522, an eighth side surface portion 1523, a ninth side surface portion 1524, and/or the tenth side surface portion 1525. According to an embodiment, the sixth to tenth side surface portions 1521, 1522, 1523, 1524, and 1525 may also be referred to as a 'sixth to tenth side surface portion frame.' According to an embodiment, at least a portion of the sixth side surface portion 1521 may be disposed in parallel with the folding area A. The seventh side surface portion 1522 may be disposed spaced apart from an end (e.g., the top) of the sixth side surface portion 1521 in a direction crossing the folding area A or substantially perpendicular to the folding area A. The eighth side surface portion 1523 may be disposed spaced apart from the opposite end (e.g., the bottom) of the sixth side surface portion 1521 in parallel with the folding area A. The ninth side surface portion 1524 may be disposed adjacent to an end of the eighth side surface portion 1523 and may be disposed spaced apart from the eighth side surface portion 1523 and may extend to the folding area A in a direction crossing, or in a direction substantially perpendicular. The tenth side surface portion 1525 may extend substantially in parallel with the folding area A. One end of the tenth side surface portion 1525 is disposed spaced apart from the an end of the seventh side surface portion 1522, and the other end of the tenth side surface portion 1525 is disposed spaced apart from an end of the ninth side surface portion 1524 According to an embodiment, the tenth side surface portion 1525 may be disposed adjacent to the hinge structure or hinge cover (e.g., the hinge structure 264 or hinge cover 265 of FIG. 4) and may extend along the folding area A substantially in parallel with the hinge structure or hinge cover.

According to an embodiment, the second side surface member 1502 may include the sixth to tenth slits 1526*a*, 1526*b*, 1526*c*, 1526*d*, and 1526*e*, which at least part separate the electrically conductive material portions, and the sixth to tenth slits 1526*a*, 1526*b*, 1526*c*, 1526*d*, and 1526*e* may be filled with an insulating material.

According to an embodiment, the sixth slit 1526*a* may be formed between one end of the sixth side surface portion 1521 and the seventh side surface portion 1522, and the seventh slit 1526*b* may be formed between the seventh side surface portion 1522 and the tenth side surface portion 1525. The eighth slit 1526*c* may be formed between the opposite end of the sixth side surface portion 1521 and the eighth side surface portion 1523. The ninth slit 1526*d* may be formed between the eighth side surface portion 1523 and the ninth side surface portion 1524, and the tenth slit 1526*e* may be formed between the ninth side surface portion 1524 and the tenth side surface portion 1525.

According to an embodiment, a sixth to tenth connection terminal 1006*a*, 1006*b*, 1006*c*, 1006*d*, and 1006*e* may be formed at the respective first ends of the plurality of second connection members 1006 to be electrically connected with ground terminals (not shown) formed in the sixth to tenth side surface portions 1521, 1522, 1523, 1524, and 1525, and a sixth to tenth switch connection terminal 1006*a*-1, 1006*b*-1, 1006*c*-1, 1006*d*-1, and 1006*e*-1 may be formed at the respective second ends of the plurality of second connection members 1006 to be electrically connected with switch terminals formed in the switching unit 1300.

FIGS. 18 and 19 illustrate a configuration of an antenna device 1500 in an electronic device (e.g., the electronic device 200 of FIG. 2), e.g., the in the plurality of housing structures 210 and 220 and hinge structure (e.g., the hinge structure 264 of FIG. 4) supporting one display (e.g., the display 230 of FIG. 4), according to an embodiment.

Referring to FIGS. 18 and 19, the antenna device 1500 may include the first side surface member 1501 and the second side surface member 1502. For example, the first side surface member 1501 may include at least one first radiation conductor 1001 and at least one second radiation conductor 1002, and the second side surface member 1502 may include at least one third radiation conductor 1003 and at least one fourth radiation conductor 1004. For example, the at least one first radiation conductor 1001 may be formed of the third side surface portion 1513 and the fourth side surface portion 1514, and the at least one second radiation conductor 1002 may be formed of the first side surface portion 1511, the second side surface portion 1512, and the fifth side surface portion 1515. For example, the at least one third radiation conductor 1003 may be formed of the eighth side surface portion 1523 and the ninth side surface portion 1524, and the at least one fourth radiation conductor 1004 may be formed of the sixth side surface portion 1521, the seventh side surface portion 1522, and the tenth side surface portion 1525.

According to an embodiment, a plurality of first connection members 1005 may be disposed in at least part of the first housing structure 210 to electrically connect the at least one first radiation conductor 1001 and the at least one second radiation conductor 1002 with the switching unit 1300. A plurality of second connection members 1006 may be disposed in at least part of the first and second housing structures 210 and 220 and at least part of the hinge structure 264 to electrically connect the at least one third radiation conductor 1003 and the at least one fourth radiation conductor 1004 with the switching unit 1300. For example, the switching unit 1300 may be disposed in the first housing structure 210. As another example, the switching unit 1300 may be disposed in a communication module 1200 described below. For example, the switching unit 1300 may be disposed inside or outside the communication module 1200. In this state, the plurality of second connection members 1006 may electrically connect the at least one third radiation conductor 1003 and the at least one fourth radiation conductor 1004 with the switching unit 1300, disposed in the second housing structure 220. In this case, the plurality of second connection members 1006 may be electrically connected with the switching unit 1300 via the hinge structure 264.

At least part of the at least one first to fourth radiation conductor 1001, 1002, 1003, and 1004 may be formed of an electrically conductive material. For example, the at least one first to fourth radiation conductor 1001, 1002, 1003, and 1004 may function as an antenna radiator (e.g., a radiation conductor) of the electronic device (e.g., the electronic device 200 of FIG. 2). For example, in the plurality of housing structures 210 and 220 and hinge structure (e.g., the hinge structure 264 of FIG. 4) supporting one display (e.g., the display 230 of FIG. 4), the processor 1400 or communication module 1200 (e.g., the processor 120 or communication module 190 of FIG. 1) of the electronic device 200 may transmit/receive radio signals using part of the at least one first to fourth radiation conductor 1001, 1002, 1003, and 1004. The communication module 1200 may perform wireless communication between the electronic device 200 and an external electronic device (e.g., the external electronic devices 102 or 104 of FIG. 1).

The at least one first radiation conductor 1001 and the at least one third radiation conductor 1003 may be formed of a main antenna, and the at least one second radiation conductor and the at least one fourth radiation conductor 1004 may be formed of a sub antenna.

For example, the main antenna may include at least one of an LTE communication antenna or 3G, 4G, and 5G communication antenna. The sub antenna may include at least one of a Wi-Fi antenna for wireless LAN communication, a Bluetooth antenna or Zigbee antenna for short-range wireless communication, a wireless charging antenna for wirelessly charging the battery, a broadcast communication antenna, and a global positioning system (GPS) antenna.

According to an embodiment, the plurality of first and second connection members 1005 and 1006 may include at least one of a coaxial cable, a flexible printed circuit board (FPCB), a micro strip line, or a strip line. According to an embodiment, although the plurality of first and second connection members 1005 and 1006 include a coaxial cable, FPCB, micro strip line, or strip line, as an example, embodiments of the disclosure are not limited thereto. For example, as the plurality of first and second connection members 1005 and 1006, any other various components may be used which may electrically connect the at least one first to fourth radiation conductor 1001, 1002, 1003, and 1004 with the switching unit 1300.

According to an embodiment, as described above in connection with FIG. 18, as the plurality of first and second connection members 1005 and 1006 are formed of coaxial cables, the radiation feature of antenna may be enhanced in the plurality of housing structures 210 and 220 and hinge structure (e.g., the hinge structure 264 of FIG. 4) supporting one display (e.g., the display 230 of FIG. 4). This may enhance the function, as a radiator, of at least one first to fourth radiation conductor 1001, 1002, 1003, and 1004.

According to an embodiment, as the plurality of first and second connection members 2005 and 2006 are formed of FPCBs as described above in connection with FIG. 19, the plurality of first and second connection members 2005 and 2006 may be prevented from damage due to repetitive folding or unfolding of the first and second housing structures (e.g., the first and second housing structures 210 and 220 of FIG. 2). For example, at least part of the plurality of second connection members 2006 formed of an FPCB may be disposed in the folded portion of the hinge structure 264 and, in this state, the plurality of second connection members 1006 may be prevented from damage in the folded portion of the hinge structure 264 when the first and second housing structures (e.g., the first and second housing structures 210 and 220 of FIG. 2) are repetitively folded or unfolded. Thus, the electrical connection between the at least one third radiation conductor 1003 and the at least one fourth radiation conductor 1004 and the switching unit 1300 may be enhanced.

Figure 20:
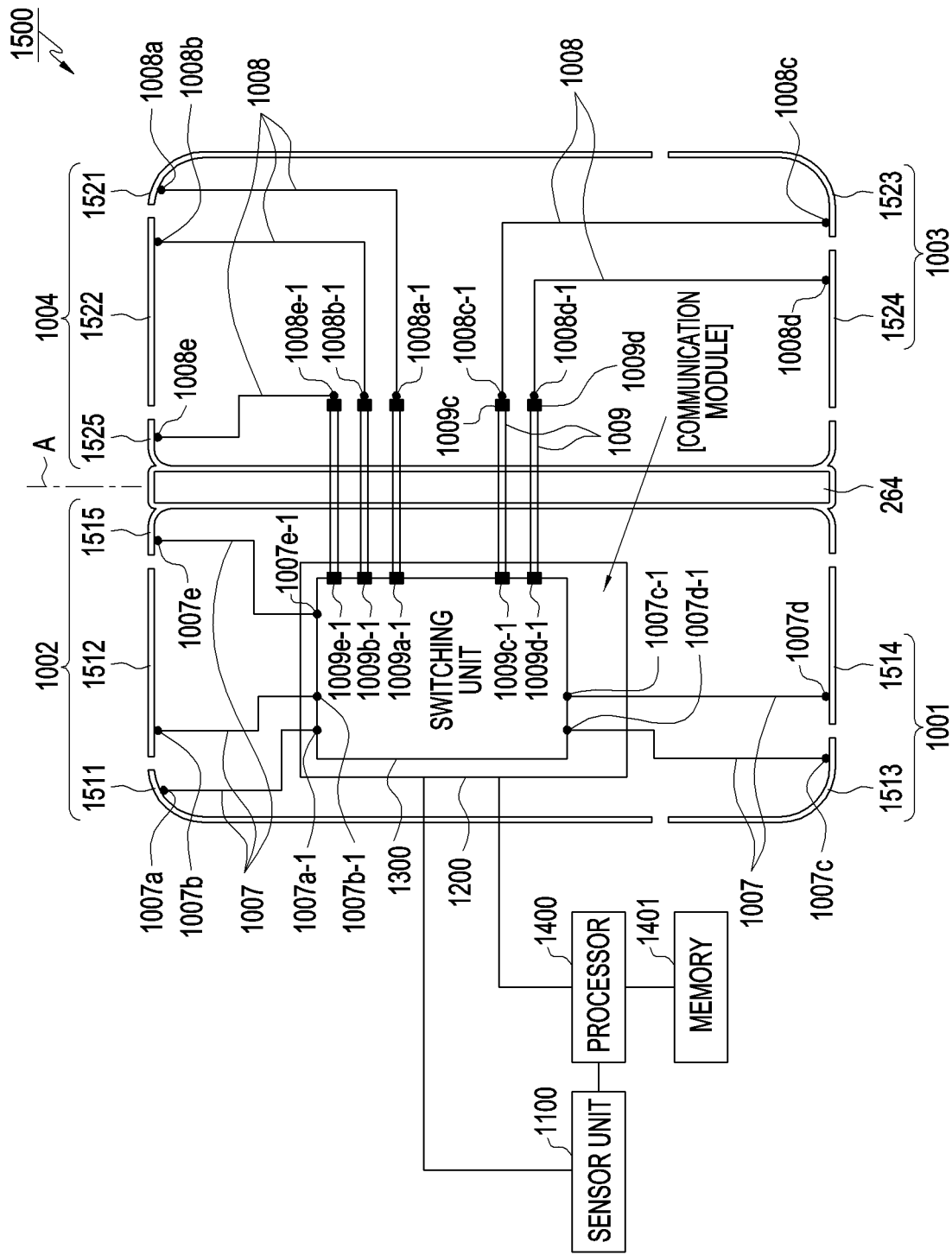
FIG. 20 is a view illustrating a configuration of a first and second side surface member electrically connected with a switching unit in a first housing structure of an electronic device using a coaxial cable and flexible printed circuit board according to an embodiment of the disclosure.

FIG. 20 is a view illustrating a configuration of a first and second side surface member 1501 and 1502 electrically connected with a switching unit 1300 in a first housing structure of an electronic device (e.g., the electronic device 200 of FIG. 2) using a coaxial cable and flexible printed circuit board according to an embodiment of the disclosure.

The electronic device 200 may be identical or similar in at least partial configuration to the above-described electronic device (e.g., the electronic device 200 of FIG. 2). Thus, at least one of the components of the electronic device 200 may be the same or similar to at least one of the components of the electronic device 200 of FIG. 2 and no duplicate description is made below.

Referring to FIG. 20, the first housing structure (e.g., the first housing structure 210 of FIG. 2) may have a plurality of third connection members 1007, which electrically connect the at least one first radiation conductor 1001 and the at least one second radiation conductor 1002 with the switching unit 1300, disposed, and the second housing structure (e.g., the second housing structure 220 of FIG. 2) may have a plurality of fourth connection members 1008, which electrically connect the at least one third radiation conductor 1003 and the at least one fourth radiation conductor 1004 with the switching unit 1300, disposed. A plurality of fifth connection members 1009 which electrically connect the plurality of fourth connection members 1008 and the switching unit 1300 may be disposed in at least part of the first and second housing structures 210 and 220 and at least part of the hinge structure 264. For example, the plurality of third connection members 1007 may be disposed in the first housing structure 210 and, in this state, the plurality of fourth connection members 1008 may be disposed in the second housing structure 220, and the plurality of fifth connection members 1009 may be disposed in at least part of the hinge structure 264.

According to an embodiment, a first to fifth connection terminal 1007a, 1007b, 1007c, 1007d, and 1007e may be formed at the respective first ends of the plurality of third connection members 1007 to be electrically connected with ground terminals (not shown) formed in the first to fifth side surface portions 1511, 1512, 1513, 1514, and 1515, and a first to fifth switch connection terminal 1007a-1, 1007b-1, 1007c-1, 1007d-1, and 1007e-1 may be formed at the respective second ends of the plurality of third connection members 1007 to be electrically connected with switch terminals formed in the switching unit 1300.

A sixth to tenth connection terminal 1008a, 1008b, 1008c, 1008d, and 1008e may be formed at the respective first ends of the plurality of fourth connection members 1008 to be electrically connected with ground terminals formed in the sixth to tenth side surface portions 1521, 1522, 1523, 1524, and 1525, and an eleventh to fifteenth connection terminal 1008a-1, 1008b-1, 1008c-1, 1008d-1, and 1008e-1 may be formed at the respective second ends of the plurality of fourth connection members 1008 to be electrically connected with the sixteenth to twentieth connection terminals 1009a, 1009b, 1009c, 1009d, and 1009e described below.

The sixteenth to twentieth connection terminals 1009a, 1009b, 1009c, 1009d, and 1009e may be formed at the respective first ends of the plurality of fifth connection members 1009 to be electrically connected with the eleventh to fifteenth connection terminals 1008a-1, 1008b-1, 1008c-1, 1008d-1, and 1008e-1 of the plurality of fourth connection members 1008, and a twenty first to twenty fifth switch connection terminal 1009a-1, 1009b-1, 1009c-1, 1009d-1, and 1009e-1 may be formed at the respective second ends of the plurality of fifth connection members 1009 to be electrically connected with switch terminals formed in the switching unit 1300.

According to an embodiment, the plurality of third and fourth connection members 1007 and 1008 may be formed of a coaxial cable, and the plurality of fifth connection members may be formed of a flexible printed circuit board (FPCB).

For example, placing the plurality of third and fourth connection members 1007 and 1008 formed of a coaxial cable in the first and second housing structures 210 and 220 may enhance electrical connection between the at least one first radiation conductor 1001 and the at least one second radiation conductor 1002 and the switching unit 1300, as well as the radiation feature of antenna.

The plurality of fifth connection members 1009 formed of an FPCB may be disposed in the folded portion of the hinge structure 264 and, thus, the plurality of fifth connection members 1009 may be prevented from damage despite repetitive folding or unfolding of the first and second housing structures 210 and 220. By preventing damage to the plurality of fifth connection members 1009 formed of an FPCB, the electrical connection between the at least one third radiation conductor 1003 and the at least one fourth radiation conductor 1004 and the switching unit 1300 may be enhanced.

As such, the plurality of third and fourth connection members 1007 and 1008 formed of a coaxial cable are disposed in the first and second housing structures 210 and 220, and the plurality of fifth connection members 1009 formed of an FPCB are disposed in the folded portion of the hinge structure 264, it is possible to enhance the electrical connection between the at least one first to fourth radiation conductor 1001, 1002, 1003, and 1004 and the switching unit 1300 in the plurality of housing structures 210 and 220 and hinge structure (e.g., the hinge structure 264 of FIG. 4) supporting one display (e.g., the display 230 of FIG. 4) and thus enhance the function, as an antenna, of the at least one first to fourth radiation conductor 1001, 1002, 1003, and 1004 while securing stable antenna performance. Further, the plurality of fifth connection members 1009 formed of an FPCB may be disposed in the folded portion of the hinge structure 264 and, in this state, the fifth connection members 1009 may be prevented from damage in the folded portion of the hinge structure 264 when the first and second housing structures 210 and 220 are repetitively folded or unfolded. Thus, the plurality of fifth connection members 1009 formed of an FPCB may enhance, and keep stable, the electrical connection between the switching unit 1300 and the at least one first to fourth radiation conductor 1001, 1002, 1003, and 1004.

Figure 21:
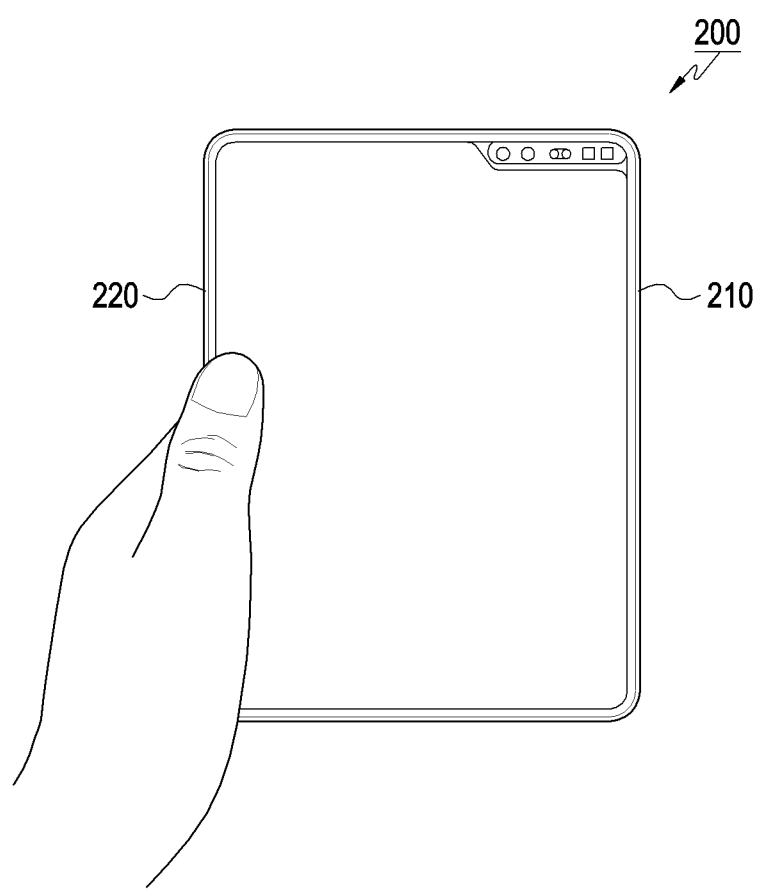
FIG. 21 is a view illustrating a hand gripped state of a second housing structure among components of an electronic device according to an embodiment of the disclosure.

FIG. 21 is a view illustrating a hand gripped state of a second housing structure (e.g., the second housing structure 220 of FIG. 2) among components of an electronic device (e.g., the electronic device 200 of FIG. 2) according to an embodiment of the disclosure.

Figure 22:
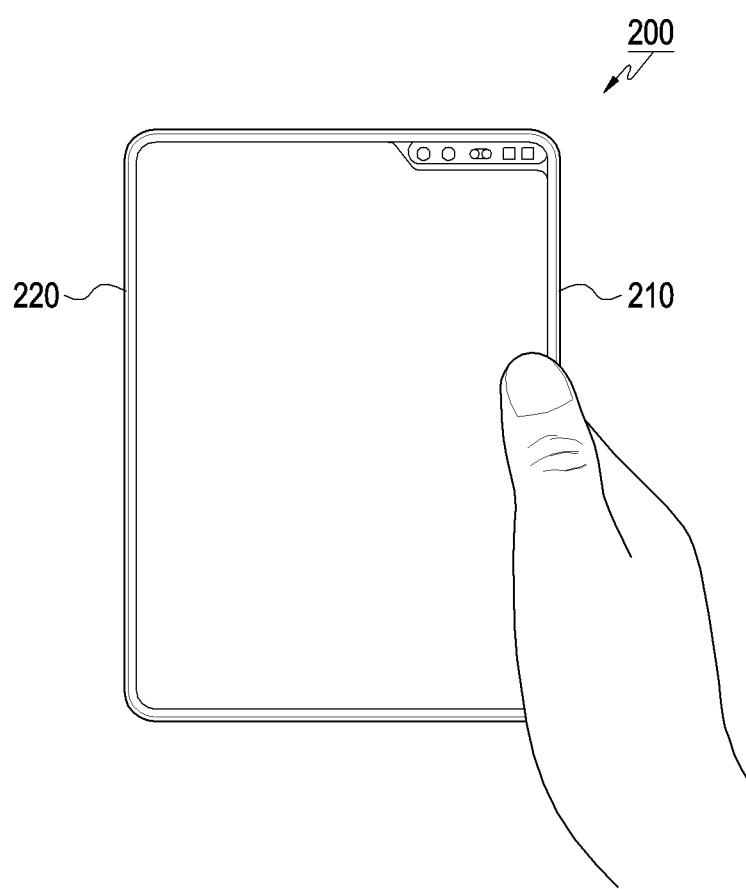
FIG. 22 is a view illustrating a hand gripped state of a first housing structure among components of an electronic device according to an embodiment of the disclosure.

FIG. 22 is a view illustrating a hand gripped state of a first housing structure (e.g., the first housing structure 210 of FIG. 2) among components of an electronic device (e.g., the electronic device 200 of FIG. 2) according to an embodiment of the disclosure.

Figure 23:
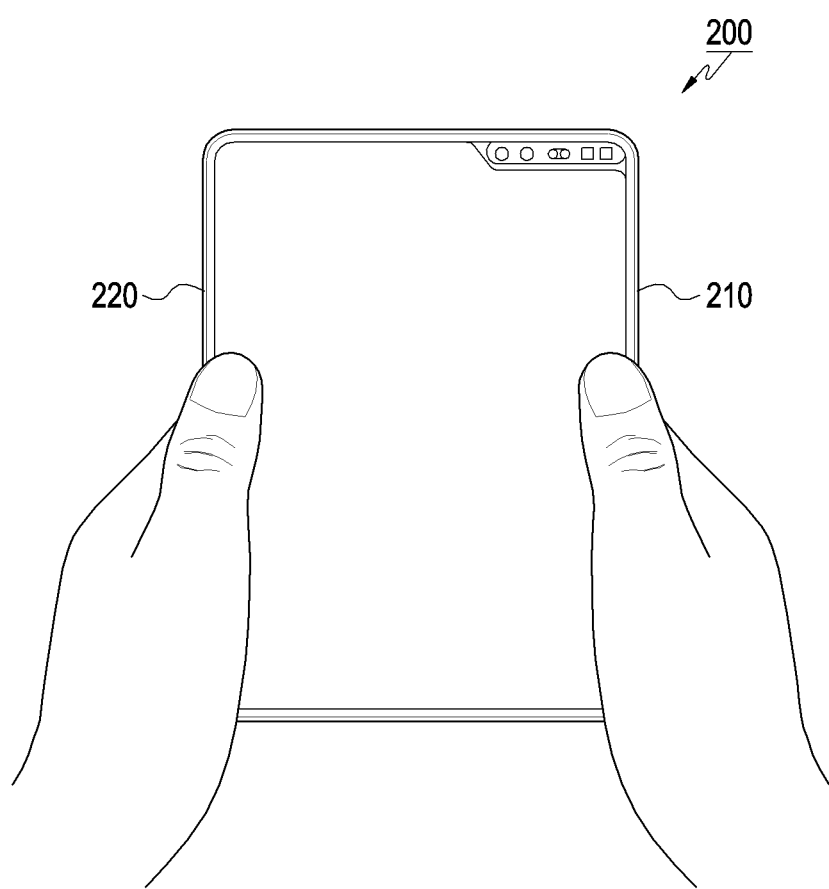
FIG. 23 is a view illustrating a hand gripped state of both a first and second housing structure among components of an electronic device according to an embodiment of the disclosure.

FIG. 23 is a view illustrating a hand gripped state of both a first and second housing structure (e.g., the first and second housing structures 210 and 220 of FIG. 2) among components of an electronic device 200 according to an embodiment of the disclosure.

Referring to FIGS. 21 through 23, the electronic device 200 may include the first housing structure 210, the second housing structure 220, and a hinge structure (e.g., the hinge structure 264 of FIG. 4). The first housing structure 210 and the second housing structure 220 may rotate on the hinge structure (e.g., the hinge structure 264 of FIG. 4), operating in the unfolded state or folded state in the plurality of housing structures 210 and 220 and hinge structure (e.g., the hinge structure 264 of FIG. 4) supporting one display (e.g., the display 230 of FIG. 4).

At least one of the components of the electronic device 200 may be the same or similar to at least one of the components of the antenna device 1500 of FIGS. 18 through 20 and no duplicate description is made below.

Further, as described above in connection with FIGS. 18 through 20, the electronic device 200 may include the at least one first to fourth radiation conductor 1001, 1002, 1003, and 1004, a sensor unit 1100, a communication module 1200, a switching unit 1300, a processor 1400, and a memory 1401.

The sensor unit 1100 may detect the operation state of the electronic device 200 and convert the detected information into an electrical signal. For example, the sensor unit 1100 may include at least one of a grip sensor and a proximity sensor. The proximity sensor may detect whether to approach the electronic device 200, e.g., approach of an external object (e.g., the user's finger or a stylus) on the display (e.g., the display 230 of FIG. 4) of the electronic device 200.

The grip sensor may detect holding or gripping the electronic device 200 in an external object (e.g., the user's hand). The grip sensor may be disposed in at least one of the left/right side surfaces, top/bottom surfaces, or back surface of the first and second housing structures 210 and 220 of the electronic device 200. The grip sensor may transfer the obtained sensor information to the processor 1400.

According to an embodiment, if the user's body touches the electronic device 200, the grip sensor may detect a variation in capacitance of the electronic device 200, thereby sensing the user's body touch. Thus, the grip sensor, as a separate sensor for detecting the user's body touch, may be mounted in the electronic device 200, or the grip sensor, as a non-separate sensor, may be implemented to detect variations in capacitance of the first and second housing structures 210 and 220 (e.g., a metal housing) of the electronic device 200.

According to an embodiment, such a grip sensor is described as an example.

For example, in the plurality of housing structures 210 and 220 and hinge structure 264 supporting one display (e.g., the display 230 of FIG. 4), the communication module 1200 may be electrically connected with the at least one first to fourth radiation conductor 1001, 1002, 1003, and 1004 to transmit/receive radio signals.

The switching unit 1300 may electrically connect the communication module 1200 with the at least one first to fourth radiation conductor 1001, 1002, 1003, and 1004.

The processor 1400 may detect a hand grip on the first housing structure 210 and/or the second housing structure 220, via the sensor unit 1100, in the unfolded state or folded state of the first and second housing structures 210 and 220 and control the switching unit 1300 to switch from the at least one first or second radiation conductor 1001 or 1002 to the at least one third or fourth radiation conductor 1003 or 1004 or from the at least one third or fourth radiation conductor 1003 or 1004 to the at least one first or second radiation conductor 1001 or 1002.

The memory 1401 may store a switch control program for controlling the switching unit 1300. For example, the switch control program may store data to control the switching unit 1300 to switch the at least one first to fourth radiation conductor 1001, 1002, 1003, and 1004. For example, the switch control program may store data for adjustment to switch from the at least one first or second radiation conductor 1001 or 1002 to the at least one third or fourth radiation conductor 1003 or 1004 or from the at least one third or fourth radiation conductor 1003 or 1004 to the at least one first or second radiation conductor 1001 or 1002 depending on the hand grip on the first and second housing structures 210 and 220.

When the first housing structure 210 is hand-gripped in the unfolded state of the first housing structure 210 and the second housing structure 220, the processor 1400 may detect the hand grip via the sensor unit 1100 and control the switching unit 1300 to switch from the at least one first or second radiation conductor 1001 or 1002 of the first housing structure 210 to the at least one third or fourth radiation conductor 1003 or 1004 of the second housing structure 220. In this case, the at least one first or second radiation conductor 1001 or 1002 of the first housing structure 210 may experience a lowering in radiation performance due to the user's hand grip. However, since the at least one third or fourth radiation conductor 1003 or 1004 of the second housing structure 220 is not in the user's hand grip, the at least one third or fourth radiation conductor 1003 or 1004 may be prevented from a lowering in radiation performance due to influence by the human body. Thus, the electronic device 200 may select the at least one third or fourth radiation conductor 1003 or 1004 by the switching unit 1300 and use it as an antenna.

According to an embodiment, when the second housing structure 220 is hand-gripped in the unfolded state of the first housing structure (e.g., the first housing structure 210 of FIG. 2) and the second housing structure (e.g., the second housing structure 220 of FIG. 2), the processor 1400 may detect the hand grip via the sensor unit 1100 and control the switching unit 1300 to switch from the at least one third or fourth radiation conductor 1003 or 1004 of the second housing structure 220 to the at least one first or second radiation conductor 1001 or 1002 of the first housing structure 210, as described above in connection with FIGS. 18 through 20 and FIG. 22. The at least one third or fourth radiation conductor 1003 or 1004 of the second housing structure 220 may, likewise, experience a lowering in radiation performance due to the user's hand grip. However, since the at least one first or second radiation conductor 1001 or 1002 of the first housing structure 210 is not in the user's hand grip, it may be prevented from a lowering in radiation performance due to influence by the human body. Thus, the electronic device 200 may select the at least one first or second radiation conductor 1001 or 1002 by the switching unit 1300 and use it as an antenna, thereby securing the antenna's stable functioning.

According to an embodiment, when both the first and second housing structures 210 and 220 are hand-gripped in the unfolded state of the first housing structure (e.g., the first housing structure 210 of FIG. 2) and the second housing structure (e.g., the second housing structure 220 of FIG. 2), the processor 1400 may detect the hand grip via the sensor unit 1100 and control the switching unit 1300 to switch to the at least one first or second radiation conductor 1001 or 1002 of the first housing structure 210, as described above in connection with FIGS. 18 through 20 and FIG. 23. For example, the at least one first or second radiation conductor 1001 or 1002 may be electrically connected with the switching unit 1300 via the plurality of first connection members 1005, and the at least one third or fourth radiation conductor 1003 or 1004 may be electrically connected with the switching unit 1300 via the plurality of second connection members 1006. The length F1 or F2 of the plurality of first connection members 1005 may be smaller than the length F3 or F4 of the plurality of second connection members 1006.

For example, as the length F1 or F2 of the plurality of first connection members 1005 is smaller than the length F3 or F4 of the plurality of second connection members 1006, the plurality of first connection members 1005 may result in smaller antenna radiation loss than the plurality of second connection members 1006 in the plurality of housing structures 210 and 220 and hinge structure 264 supporting one display (e.g., the display 230 of FIG. 4). Thus, the at least one first or second radiation conductor 1001 or 1002 may present more stable radiation performance than the at least one third or fourth radiation conductor. Thus, the processor 1400 may control the switching unit 1300 to select the at least one first or second radiation conductor 1001 or 1002 of the first housing structure 210. Thus, with both the first and second housing structures 210 and 220 hand-gripped, the at least one first or second radiation conductor 1001 or 1002 may be used as an antenna. Thus, the electronic device 200 may secure a stable antenna performance using the at least one first or second radiation conductor 1001 or 1002 as an antenna.

According to an embodiment, when both the first and second housing structures 210 and 220 are hand-gripped in the unfolded state of the first housing structure (e.g., the first housing structure 210 of FIG. 2) and the second housing structure (e.g., the second housing structure 220 of FIG. 2), the processor 1400 may detect the hand grip via the sensor unit 1100 and control the switching unit 1300 to switch to the at least one first or second radiation conductor 1001 or 1002 of the first housing structure, as described above in connection with FIG. 16B and FIGS. 18 through 20. For example, the at least one first or second radiation conductor 1001 or 1002 may be electrically connected with the switching unit 1300 via the plurality of first connection members 1005, and the at least one third or fourth radiation conductor 1003 or 1004 may be electrically connected with the switching unit 1300 via the plurality of second connection members 1006. As the length F1 or F2 of the plurality of first connection members 1005 is smaller than the length F3 or F4 of the plurality of second connection members 1006, the plurality of first connection members 1005 may result in smaller antenna radiation loss than the plurality of second connection members 1006. Thus, the at least one first or second radiation conductor 1001 or 1002 may present more stable radiation performance than the at least one third or fourth radiation conductor. Thus, the processor 1400 may control the switching unit 1300 to select the at least one first or second radiation conductor 1001 or 1002 of the first housing structure 210. Thus, the at least one first or second radiation conductor 1001 or 1002 may be used as an antenna, with the folded first and second housing structures 210 and 220 hand-gripped.

As such, although the first and second housing structures 210 and 220 both are hand-gripped in the unfolded state of the first and second housing structures 210 and 220 in the plurality of housing structures 210 and 220 and hinge structure 264 supporting one display (e.g., the display 230 of FIG. 4), the electronic device 200 may secure a stable antenna performance using the at least one first or second radiation conductor 1001 or 1002 as an antenna.

According to an embodiment, an electronic device (e.g., the electronic device 200 of FIG. 2) with an antenna device (e.g., the antenna device 500 of FIG. 6) comprises a first housing structure (e.g., the first housing structure 210 of FIG. 2) including a first surface facing in a first direction, a second surface facing in a second direction opposite to the first direction, and a first side surface member (e.g., the first side surface member 501 of FIG. 5) at least partially surrounding a space between the first surface and the second surface, the first housing structure (e.g., the first housing structure 210 of FIG. 2) at least partially formed of an electrically conductive material, a second housing structure (e.g., the second housing structure 220 of FIG. 2) including a third surface facing in a third direction, a fourth surface facing in a fourth direction opposite to the third direction, and a second side surface member (e.g., the second side surface member 502 of FIG. 5) at least partially surrounding a space between the third surface and the fourth surface, the second housing structure (e.g., the second housing structure 220 of FIG. 2) at least partially formed of an electrically conductive material, a hinge structure (e.g., the hinge structure 264 of FIG. 4) rotatably connecting the first housing structure (e.g., the first housing structure 210 of FIG. 2) and the second housing structure (e.g., the second housing structure 220 of FIG. 2) and providing a folding axis (e.g., A of FIG. 5) on which the first housing structure (e.g., the first housing structure 210 of FIG. 2) and the second housing structure (e.g., the second housing structure 220 of FIG. 2) rotate, and at least one printed circuit board disposed between the first surface and the second surface or between the third surface and the fourth surface, wherein the first side surface member (e.g., the first side surface member 501 of FIG. 5) and the second side surface member (e.g., the second side surface member 502 of FIG. 5) includes a first side surface portion (e.g., the first side surface portion 511 of FIG. 5) disposed in parallel with the folding axis (e.g., A of FIG. 5), a second side surface portion (e.g., the second side surface portion 512 of FIG. 5) extending from an end of the first side surface portion (e.g., the first side surface portion 511 of FIG. 5) in a direction crossing the folding axis (e.g., A of FIG. 5), a third side surface portion (e.g., the third side surface portion 513 of FIG. 5) extending from another end of the first side surface portion (e.g., the first side surface portion 511 of FIG. 5) in parallel with the folding axis (e.g., A of FIG. 5), a fourth side surface portion (e.g., the fourth side surface portion 514 of FIG. 5) connected with the third side surface portion (e.g., the third side surface portion 513 of FIG. 5) and extending from the third side surface portion (e.g., the third side surface portion 513 of FIG. 5) in a direction crossing the folding axis (e.g., A of FIG. 5), a fifth side surface portion (e.g., the fifth side surface portion 515 of FIG. 5) connecting the second side surface portion (e.g., the second side surface portion 512 of FIG. 5) and the fourth side surface portion (e.g., the fourth side surface portion 514 of FIG. 5) and extending in parallel with the folding axis (e.g., A of FIG. 5), the fifth side surface portion (e.g., the fifth side surface portion 515 of FIG. 5) disposed adjacent to the hinge structure (e.g., the hinge structure 264 of FIG. 4), a first slit (e.g., the first slit 516a of FIG. 5) formed between an end of the first side surface portion (e.g., the first side surface portion 511 of FIG. 5) and the second side surface portion (e.g., the second side surface portion 512 of FIG. 5), a second slit (e.g., the second slit 516b of FIG. 5) formed between the second side surface portion (e.g., the second side surface portion 512 of FIG. 5) and the fifth side surface portion (e.g., the fifth side surface portion 515 of FIG. 5), a third slit (e.g., the third slit 516c of FIG. 5) formed between another end of the first side surface portion (e.g., the first side surface portion 511 of FIG. 5) and the third side surface portion (e.g., the third side surface portion 513 of FIG. 5), and a fourth slit (e.g., the fourth slit 516d of FIG. 5) formed between the third side surface portion (e.g., the third side surface portion 513 of FIG. 5) and the fourth side surface portion (e.g., the fourth side surface portion 514 of FIG. 5), and a fifth slit (e.g., the fifth slit 516e of FIG. 5) formed between the fourth side surface portion (e.g., the fourth side surface portion 514 of FIG. 5) and the fifth side surface portion (e.g., the fifth side surface portion 515 of FIG. 5), and wherein at least part of at least one of the second side surface portion (e.g., the second side surface portion 512 of FIG. 5), the third side surface portion (e.g., the third side surface portion 513 of FIG. 5), and the fourth side surface portion (e.g., the fourth side surface portion 514 of FIG. 5) is formed of a radiation conductor and is electrically connected to the printed circuit board.

According to an embodiment, the third side surface portion may include a first portion formed in a first length along a direction parallel with the folding axis and a second portion connected with the first portion and formed in a second length along a direction crossing the folding axis.

According to an embodiment, the first portion may be longer than the second portion.

According to an embodiment, the third slit may be formed within a distance not less than 30 mm and not more than 50 mm from the second portion of the third side surface portion in a direction parallel with the folding axis.

According to an embodiment, the first length may range from 30 mm to 50 mm, and the second length may range from 8.6 mm to 28.6 mm.

According to an embodiment, the third side surface portion may include a ground terminal, a power supply terminal, and a switch terminal, and wherein the ground terminal may be provided in the third side surface portion to be electrically connected with a ground portion included in the printed circuit board in a position adjacent to the fourth slit, the power supply terminal may be provided in the third side surface portion to be electrically connected with a power supply portion included in the printed circuit board between the ground terminal and the switch terminal, and the switch terminal may be provided in the third side surface portion to be electrically connected with a switch portion included in the printed circuit board in a position adjacent to the power supply terminal.

According to an embodiment, the fourth side surface portion may include a power supply terminal, and wherein the power supply terminal may be provided in the fourth side surface portion to be electrically connected with a power supply portion included in the printed circuit board in a position adjacent to the fourth slit.

According to an embodiment, the first, second, third, fourth, and fifth slits may be filled with an insulating material.

According to an embodiment, the first housing structure and the second housing structure may be rotated on the hinge structure to be folded to allow the first surface to face the third surface or to allow the first surface to be positioned side by side, wherein in the folded position where the first surface faces the third surface, the first, second, third, fourth, and fifth slits of the first side surface member of the first housing structure adjacently face the first, second, third, fourth, and fifth slits of the second side surface member of the second housing structure, and in the position where the first surface and the third surface may be disposed side by side, the first, second, third, fourth, and fifth slits of the first side surface member of the first housing structure may be symmetrical with the first, second, third, fourth, and fifth slits of the second side surface member of the second housing structure with respect to the folding axis.

According to an embodiment, an electronic device (e.g., the electronic device 200 of FIG. 2) with an antenna device (e.g., the antenna device 500 of FIG. 2) comprises a first housing structure including a first surface facing in a first direction, a second surface facing in a second direction opposite to the first direction, and a first side surface member at least partially surrounding a space between the first surface and the second surface, the first housing structure at least partially formed of an electrically conductive material, a second housing structure including a third surface facing in a third direction, a fourth surface facing in a fourth direction opposite to the third direction, and a second side surface member at least partially surrounding a space between the third surface and the fourth surface, the second housing structure at least partially formed of an electrically conductive material, a hinge structure rotatably connecting the first housing structure and the second housing structure and providing a folding axis on which the first housing structure and the second housing structure rotate, and at least one printed circuit board disposed between the first surface and the second surface or between the third surface and the fourth surface, wherein the first side surface member (e.g., the first side surface member 501 of FIG. 5) may include a first side surface portion (e.g., the first side surface portion 511 of FIG. 5) disposed in parallel with the folding axis, a second side surface portion (e.g., the second side surface portion 512 of FIG. 5) extending from an end of the first side surface portion in a direction crossing the folding axis, a third side surface portion extending from another end of the first side surface portion in parallel with the folding axis, a fourth side surface portion (e.g., the fourth side surface portion 514 of FIG. 5) connected with the third side surface portion and extending from the third side surface portion in a direction crossing the folding axis, a fifth side surface portion (e.g., the fifth side surface portion 515 of FIG. 5) connecting the second side surface portion and the fourth side surface portion and extending in parallel with the folding axis, the fifth side surface portion disposed adjacent to the hinge structure, a first slit (e.g., the first slit 516a of FIG. 5) formed between an end of the first side surface portion and the second side surface portion, a second slit (e.g., the second slit 516b of FIG. 5) formed between the second side surface portion and the fifth side surface portion, a third slit (e.g., the third slit 516c of FIG. 5) formed between another end of the first side surface portion and the third side surface portion, and a fourth slit (e.g., the fourth slit 516d of FIG. 5) formed between the third side surface portion and the fourth side surface portion, and a fifth slit (e.g., the fifth slit 516e of FIG. 5) formed between the fourth side surface portion and the fifth side surface portion, and the second side surface member (e.g., the second side surface member 502 of FIG. 5) may include a sixth side surface portion (e.g., the sixth side surface portion 521 of FIG. 5) disposed in parallel with the folding axis, a seventh side surface portion (e.g., the seventh side surface portion 522 of FIG. 5) extending from an end of the sixth side surface portion in a direction crossing the folding axis, an eighth side surface portion (e.g., the eighth side surface portion 523 of FIG. 5) extending from another end of the sixth side surface portion in parallel with the folding axis, a ninth side surface portion (e.g., the ninth side surface portion 524 of FIG. 5) connected with the eighth side surface portion and extending from the eighth side surface portion in a direction crossing the folding axis, a tenth side surface portion (e.g., the tenth side surface portion 525 of FIG. 5) connecting the seventh side surface portion and the ninth side surface portion and extending in parallel with the folding axis, the tenth side surface portion disposed adjacent to the hinge structure, a sixth slit (e.g., the sixth slit 526a of FIG. 5) formed between an end of the sixth side surface portion and the seventh side surface portion, a seventh slit (e.g., the seventh slit 526b of FIG. 5) formed between the seventh side surface portion and the tenth side surface portion, an eighth slit (e.g., the eighth slit 526c of FIG. 5) formed between another end of the sixth side surface portion and the eighth side surface portion, a ninth slit (e.g., the ninth slit 526d of FIG. 5) formed between the eighth side surface portion and the ninth side surface portion, and a tenth slit (e.g., the tenth slit 526e of FIG. 5) formed between the ninth side surface portion and the tenth side surface portion, and wherein at least part of at least one of the second side surface portion, the third side surface portion, and the fourth side surface portion may be formed of a radiation conductor and may be electrically connected to the printed circuit board, and at least part of at least one of the seventh side surface portion, the eighth side surface portion, and the ninth side surface portion may be formed of a radiation conductor and may be electrically connected to the printed circuit board.

According to an embodiment, the third side surface portion may include a first portion formed in a predetermined first length L1 along a direction parallel with the folding axis and a second portion connected with the first portion and formed in a predetermined second length L2 along a direction crossing the folding axis, and the eighth side surface portion may include a third portion formed in a predetermined third length L3 along a direction parallel with the folding axis and a fourth portion connected with the third portion and formed in a predetermined fourth length L4 along a direction crossing the folding axis.

According to an embodiment, the first portion may be longer than the second portion, and the third portion may be longer than the fourth portion.

According to an embodiment, the third slit may be formed within a distance D1 not less than 30 mm and not more than 50 mm from the second portion of the third side surface portion in a direction parallel with the folding axis, and the eighth slit may be formed within a distance D2 not less than 30 mm and not more than 50 mm from the fourth portion of the eighth side surface portion in a direction parallel with the folding axis.

According to an embodiment, the predetermined first length L1 and the predetermined third length L3 may range from 30 mm to 50 mm, and the predetermined second length L2 and the predetermined fourth length L4 may range from 8.6 mm to 28.6 mm.

According to an embodiment, the eighth side surface portion may include a ground terminal, a power supply terminal, and a switch terminal, and wherein the ground terminal may be provided in the eighth side surface portion to be electrically connected with a ground portion included in the printed circuit board in a position adjacent to the ninth slit, the power supply terminal may be provided in the eighth side surface portion to be electrically connected with a power supply portion included in the printed circuit board between the ground terminal and the switch terminal, and the switch terminal may be provided in the eighth side surface portion to be electrically connected with a switch portion included in the printed circuit board in a position adjacent to the power supply terminal.

According to an embodiment, the ninth side surface portion may include a power supply terminal, and wherein the power supply terminal may be provided in the ninth side surface portion to be electrically connected with a power supply portion included in the printed circuit board in a position adjacent to the ninth slit.

According to an embodiment, the first, second, third, fourth, fifth, sixth, seventh, eighth, ninth, and tenth slits may be filled with an insulating material.

According to an embodiment, the first housing structure and the second housing structure may be rotated on the hinge structure to be folded to allow the first surface to face the third surface or to allow the first surface to be positioned side by side, wherein in the folded position where the first surface faces the third surface, the first, second, third, fourth, and fifth slits of the first side surface member of the first housing structure adjacently face the sixth, seventh, eighth, ninth, and tenth slits of the second side surface member of the second housing structure, and in the position where the first surface and the third surface may be disposed side by side, the first, second, third, fourth, and fifth slits of the first side surface member of the first housing structure may be symmetrical with the sixth, seventh, eighth, ninth, and tenth slits of the second side surface member of the second housing structure with respect to the folding axis.

According to an embodiment, an electronic device (e.g., the electronic device 200 of FIG. 2) with an antenna device (e.g., the antenna device 1500 of FIG. 18) comprises a first housing structure (e.g., the first housing structure 210 of FIG. 2) including a first side surface member, a second housing structure (e.g., the second housing structure 220 of FIG. 2) including a second side surface member, and a hinge structure (e.g., the hinge structure 264 of FIG. 4) rotatably connecting the first housing structure and the second housing structure and providing a folding axis (e.g., the folding axis A of FIG. 5) on which the first housing structure and the second housing structure rotate, wherein the first side surface member (e.g., the first side surface member 1501 of FIG. 18) may include at least one first radiation conductor and at least one second radiation conductor, and the second side surface member (e.g., the second side surface member 1502 of FIG. 18) may include at least one third radiation conductor and at least one fourth radiation conductor, wherein a plurality of first connection members (e.g., the plurality of first connection members 1005 of FIG. 18) may be disposed in at least part of the first housing structure to electrically connect the at least one first radiation conductor (e.g., the at least one first radiation conductor 1001 of FIG. 18) and the at least one second radiation conductor (e.g., the second radiation conductor 1002 of FIG. 18) with a switching unit (e.g., the switching unit 1300 of FIG. 18) disposed in the first housing structure, and a plurality of second connection members (e.g., the plurality of second connection members 1006 of FIG. 18) may be disposed in at least part of the first and second housing structures and at least part of the hinge structure to electrically connect the at least one third radiation conductor (e.g., the third radiation conductor 1003 of FIG. 18) and the at least one fourth radiation conductor (e.g., the fourth radiation conductor 1004 of FIG. 18) with the switching unit (e.g., the switching unit 1300 of FIG. 18).

According to an embodiment, the first side surface member (e.g., the first side surface member 1501 of FIG. 18) may include a first side surface portion (e.g., the first side surface portion 1511 of FIG. 18) disposed in parallel with the folding axis, a second side surface portion (e.g., the second side surface portion 1512 of FIG. 18) extending from an end of the first side surface portion in a direction crossing the folding axis, a third side surface portion (e.g., the third side surface portion 1513 of FIG. 18) extending from another end of the first side surface portion in parallel with the folding axis, a fourth side surface portion (e.g., the fourth side surface portion 1514 of FIG. 18) connected with the third side surface portion and extending from the third side surface portion in a direction crossing the folding axis, and a fifth side surface portion (e.g., the fifth side surface portion 1515 of FIG. 18) connecting the second side surface portion and the fourth side surface portion and extending in parallel with the folding axis, the fifth side surface portion disposed adjacent to the hinge structure, a first slit (e.g., the first slit 1516a of FIG. 18) formed between an end of the first side surface portion and the second side surface portion, a second slit (e.g., the second slit 1516b of FIG. 18) formed between the second side surface portion and the fifth side surface portion, a third slit (e.g., the third slit 1516c of FIG. 18) formed between another end of the first side surface portion and the third side surface portion, a fourth slit (e.g., the fourth slit 1516d of FIG. 18) formed between the third side surface portion and the fourth side surface portion, and a fifth slit (e.g., the fifth slit 1516e of FIG. 18) formed between the fourth side surface portion and the fifth side surface portion, and wherein the third side surface portion and the fourth side surface portion may be formed of the at least one first radiation conductor, and the first side surface portion, the second side surface portion, and the fifth side surface portion may be formed of the at least one second radiation conductor.

According to an embodiment, the second side surface member (e.g., the second side surface member 1502 of FIG. 18) may include a sixth side surface portion (e.g., the sixth side surface portion 1521 of FIG. 18) disposed in parallel with the folding axis, a seventh side surface portion (e.g., the seventh side surface portion 1522 of FIG. 18) extending from an end of the sixth side surface portion in a direction crossing the folding axis, an eighth side surface portion (e.g., the eighth side surface portion 1523 of FIG. 18) extending from another end of the sixth side surface portion in parallel with the folding axis, a ninth side surface portion (e.g., the ninth side surface portion 1524 of FIG. 18) connected with the eighth side surface portion and extending from the eighth side surface portion in a direction crossing the folding axis, and a tenth side surface portion (e.g., the tenth side surface portion 1525 of FIG. 18) connecting the seventh side surface portion and the ninth side surface portion and extending in parallel with the folding axis, the tenth side surface portion disposed adjacent to the hinge structure, a sixth slit (e.g., the sixth slit 1526*a* of FIG. 18) formed between an end of the sixth side surface portion and the seventh side surface portion, a seventh slit (e.g., the seventh slit 1526*b* of FIG. 18) formed between the seventh side surface portion and the tenth side surface portion, an eighth slit (e.g., the eighth slit 1526*c* of FIG. 18) formed between another end of the sixth side surface portion and the eighth side surface portion, a ninth slit (e.g., the ninth slit 1526*d* of FIG. 18) formed between the eighth side surface portion and the ninth side surface portion, and a tenth slit (e.g., the tenth slit 1526*e* of FIG. 18) formed between the ninth side surface portion and the tenth side surface portion, and wherein the eighth side surface portion and the ninth side surface portion may be formed of the at least one third radiation conductor, and the sixth side surface portion, the seventh side surface portion, and the tenth side surface portion may be formed of the at least one fourth radiation conductor.

According to an embodiment, the at least one first radiation conductor and the at least one third radiation conductor may be formed of a main antenna, and the at least one second radiation conductor and the at least one fourth radiation conductor may be formed of a sub antenna.

According to an embodiment, the plurality of first and second connection members include at least one of a coaxial cable, a flexible printed circuit board (FPCB), a micro strip line, or a strip line.

According to an embodiment, the plurality of first connection members may be shorter than the plurality of second connection members (e.g., as shown in FIG. 18, the lengths F1 and F2 of the plurality of first connection members may be smaller than the lengths F3 and F4 of the plurality of second connection members).

According to an embodiment, a plurality of third connection members (e.g., the third connection member 1007 of FIG. 20) may be disposed in the first housing structure to electrically connect the at least one first radiation conductor and the at least one second radiation conductor with the switching unit, a plurality of fourth connection members (e.g., the fourth connection member 1008 of FIG. 20) may be disposed in the second housing structure to electrically connect the at least one third radiation conductor and the at least one fourth radiation conductor with the switching unit, and a plurality of fifth connection members (e.g., the fifth connection member 1009 of FIG. 20) may be disposed in at least part of the first and second housing structures and at least part of the hinge structure to electrically connect the plurality of fourth connection members with the switching unit.

According to an embodiment, the plurality of third and fourth connection members may be formed of a coaxial cable, and the plurality of fifth connection members may be formed of a flexible printed circuit board (FPCB).

According to an embodiment, the electronic device may further comprise a sensor unit (e.g., the sensor unit 1100 of FIG. 18) electrically connected with the at least one first to fourth radiation conductor, a communication module (e.g., the communication module 1200 of FIG. 18) electrically connected with the at least one first to fourth radiation conductor and configured to transmit/receive a wireless signal, the switching unit (e.g., the switching unit 1300 of FIG. 18) electrically connecting the communication module with the at least one first to fourth radiation conductor, and a processor configured to detect, via the sensor unit, a hand grip on the first housing structure and/or the second housing structure in an unfolded state or folded state of the first housing structure and the second housing structure and control the switching unit to switch from the at least one first radiation conductor and the at least one second radiation conductor to the at least one third radiation conductor and the at least one fourth radiation conductor or from the at least one third radiation conductor and the at least one fourth radiation conductor to the at least one first radiation conductor and the at least one second radiation conductor.

According to an embodiment, the processor may be configured to detect, via the sensor unit, a hand grip on the first housing structure in the unfolded state and control the switching unit to switch from the at least one first radiation conductor and the at least one second radiation conductor to the at least one third radiation conductor and the at least one fourth radiation conductor.

According to an embodiment, the processor may be configured to detect, via the sensor unit, a hand grip on the second housing structure in the unfolded state and control the switching unit to switch from the at least one third radiation conductor and the at least one fourth radiation conductor to the at least one first radiation conductor and the at least one second radiation conductor.

According to an embodiment, the processor may be configured to detect, via the sensor unit, a hand grip on both the first housing structure and the second housing structure in the unfolded state and control the switching unit to switch the at least one first radiation conductor and the at least one second radiation conductor.

According to an embodiment, the processor may be configured to detect, via the sensor unit, a hand grip on both the first housing structure and the second housing structure in the folded state and control the switching unit to switch the at least one first radiation conductor and the at least one second radiation conductor.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. A portable communication device comprising:
a housing including a first housing portion and a second housing portion;
a flexible display including a first display portion accommodated in the first housing portion, and a second display portion accommodated in the second housing portion, the flexible display foldable about a folding axis according to the housing being folded;
a hinge structure accommodated in the housing, and connected with the first housing portion and the second housing portion; and
a wireless communication circuit accommodated in the housing; and
a printed circuit board accommodated in the first housing portion,
wherein a lateral portion of the first housing portion includes:
a first lateral portion located opposite to the hinge structure and substantially parallel with the folding axis,
a second lateral portion extended from a first end of the first lateral portion toward the folding axis,
a third lateral portion extended from a second end of the first lateral portion toward the folding axis, the third lateral portion including a ground portion electrically connected with the printed circuit board and a power supply portion electrically connected with the wireless communication circuit,
a first slit formed in the first lateral portion as closer to the third lateral portion than to the second lateral portion,
a second slit formed in the second lateral portion, and
a third slit formed in the third lateral portion such that the ground portion is located as closer to the third slit than to the first lateral portion,
wherein a first length of a part of the first lateral portion between the first slit and the third lateral portion is longer than a second length of a part of the third lateral portion between the first lateral portion and the ground portion, and
wherein the part of the first lateral portion is directly extended to the part of the third lateral portion such that the part of the first lateral portion and the part of the third lateral portion together are configured to operate as an antenna radiator via the wireless communication circuit for the portable communication device.

2. The portable communication device of claim 1, wherein the power supply portion is located between the first lateral portiona and the ground portion.

3. The portable communication device of claim 2, wherein is closer to the ground portion than to the first lateral portion.

4. The portable communication device of claim 1, wherein the third lateral portion includes a switching portion electrically connected with a processor and disposed between the power supply portion and the first lateral portion.

5. The portable communication device of claim 1, wherein the first length is between 30 mm and 50 mm.

6. The portable communication device of claim 1, wherein the second housing portion includes a fourth lateral portion including a fourth slit formed therein, a fifth lateral portion including a fifth slit formed therein, and a sixth lateral portion including a sixth slit formed therein, and wherein, when the housing is fully folded, the first slit, the second slit and the third slit are substantially aligned with the fourth slit, the fifth slit and the sixth slit, respectively.

7. The portable communication device of claim 6,
wherein the part of the first lateral portion and the part of the third lateral portion together are configured to operate as a first antenna radiator via the wireless communication circuit for the portable communication device, and
wherein a part of the fourth lateral portion and a part of the sixth lateral portion together are configured to operate as a second antenna radiator via the wireless communication circuit for the portable communication device.

8. The portable communication device of claim 7,
wherein the third lateral portion including a first ground portion electrically connected with the printed circuit board and a first power supply portion electrically connected with the wireless communication circuit, and
wherein the sixth lateral portion including a second ground portion electrically connected with the printed circuit board and a second power supply portion electrically connected with the wireless communication circuit.

9. The portable communication device of claim 8, wherein a third length of a part of the fourth lateral portion between the fourth slit and the sixth lateral portion is longer than a fourth length of a part of the sixth lateral portion between the fourth lateral portion and the second ground portion.

10. The portable communication device of claim 9, wherein the third length is between 30mm and 50mm.

11. The portable communication device of claim 7, further comprising:
a processor; and
memory storing instruction that, when executed by the processor, cause the portable communication device to:
switch the operation of the first antenna radiator and the operation of the second antenna radiator depending on a hand grip on the first housing portion and second housing portion.

12. The portable communication device of claim 1, wherein the first lateral portion is foldable about the folding axis.

13. The portable communication device of claim 6, wherein the first, second, third, fourth, fifth, and sixth slits are filled with an insulating material.

14. The portable communication device of claim 7, wherein the first antenna radiator supports a first frequency band and, the second antenna radiator supports a second frequency band.

15. The portable communication device of claim 7, further comprising:
a seventh slit formed in the third lateral portion.

16. The portable communication device of claim 15,
wherein another part of the third lateral portion between the third slit and the seventh slit includes a third power supply portion electrically connected with the wireless communication circuit, and
wherein the another part of the third lateral portion is configured to operate as an third antenna radiator support a third frequency band via the wireless communication circuit for the portable communication device.

17. The portable communication device of claim 16,
wherein a first frequency band supported by the first antenna radiator includes a low frequency band, and
wherein a third frequency band supported by the third antenna radiator includes mid/high frequency band.

* * * * *